(12) United States Patent
Yoshino et al.

(10) Patent No.: US 9,275,250 B2
(45) Date of Patent: Mar. 1, 2016

(54) SEARCHABLE ENCRYPTION PROCESSING SYSTEM

(75) Inventors: Masayuki Yoshino, Yokohama (JP); Hisayoshi Sato, Sagamihara (JP); Ken Naganuma, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 137 days.

(21) Appl. No.: 13/825,643

(22) PCT Filed: Nov. 29, 2011

(86) PCT No.: PCT/JP2011/077588
§ 371 (c)(1),
(2), (4) Date: Jun. 14, 2013

(87) PCT Pub. No.: WO2012/077541
PCT Pub. Date: Jun. 14, 2012

(65) Prior Publication Data
US 2013/0262863 A1    Oct. 3, 2013

(30) Foreign Application Priority Data

Dec. 8, 2010  (JP) ................................. 2010-273556

(51) Int. Cl.
*G06F 21/62* (2013.01)
*H04L 9/00* (2006.01)
*G06F 17/30* (2006.01)

(52) U.S. Cl.
CPC ...... *G06F 21/6218* (2013.01); *G06F 17/30483* (2013.01); *H04L 9/008* (2013.01)

(58) Field of Classification Search
USPC .......... 713/165, 150, 163, 181; 726/2, 21, 36; 380/255, 264, 276
See application file for complete search history.

(56) References Cited

U.S. PATENT DOCUMENTS

2001/0019614 A1* 9/2001 Madoukh ....................... 380/277
2009/0300351 A1* 12/2009 Lei et al. ........................ 713/165

FOREIGN PATENT DOCUMENTS

JP   2007-114494 A    5/2007

OTHER PUBLICATIONS

Song et al., "Practical Techniques for Searches on Encrypted Data", In Proceedings of the 2000 IEEE Symposium on Security and Privacy, 2000, pp. 44-55.
Yang et al., "Privacy-Preserving Queries on Encrypted Data", In Proceedings of the 11th European Symposium on Research in Computer Security (Esorics), vol. 4189 of Lecture Notes in Computer Science, 2006, pp. 476-495.

* cited by examiner

*Primary Examiner* — Jason K. Gee
*Assistant Examiner* — Sharif E Ullah
(74) *Attorney, Agent, or Firm* — Mattingly & Malur, PC

(57) ABSTRACT

In the searchable encryption processing system, a data base server retaining data, a registration client which deposits the data into the data base server, and a search client which causes the data base server to search the data collaborate across a network, wherein the registration client, using a probabilistic encryption method which uses a mask using a homomorphic function and a hash value, deposits the encrypted data into the server, whereupon the search client, using probabilistic encryption which uses the mask which uses the homomorphic function for encryption of the search query, outputs the search query and non-corresponding data as search results without causing the data base server to unmask the mask and without allowing the frequency of occurrences of the data corresponding to the search to leak to the data base server.

4 Claims, 14 Drawing Sheets

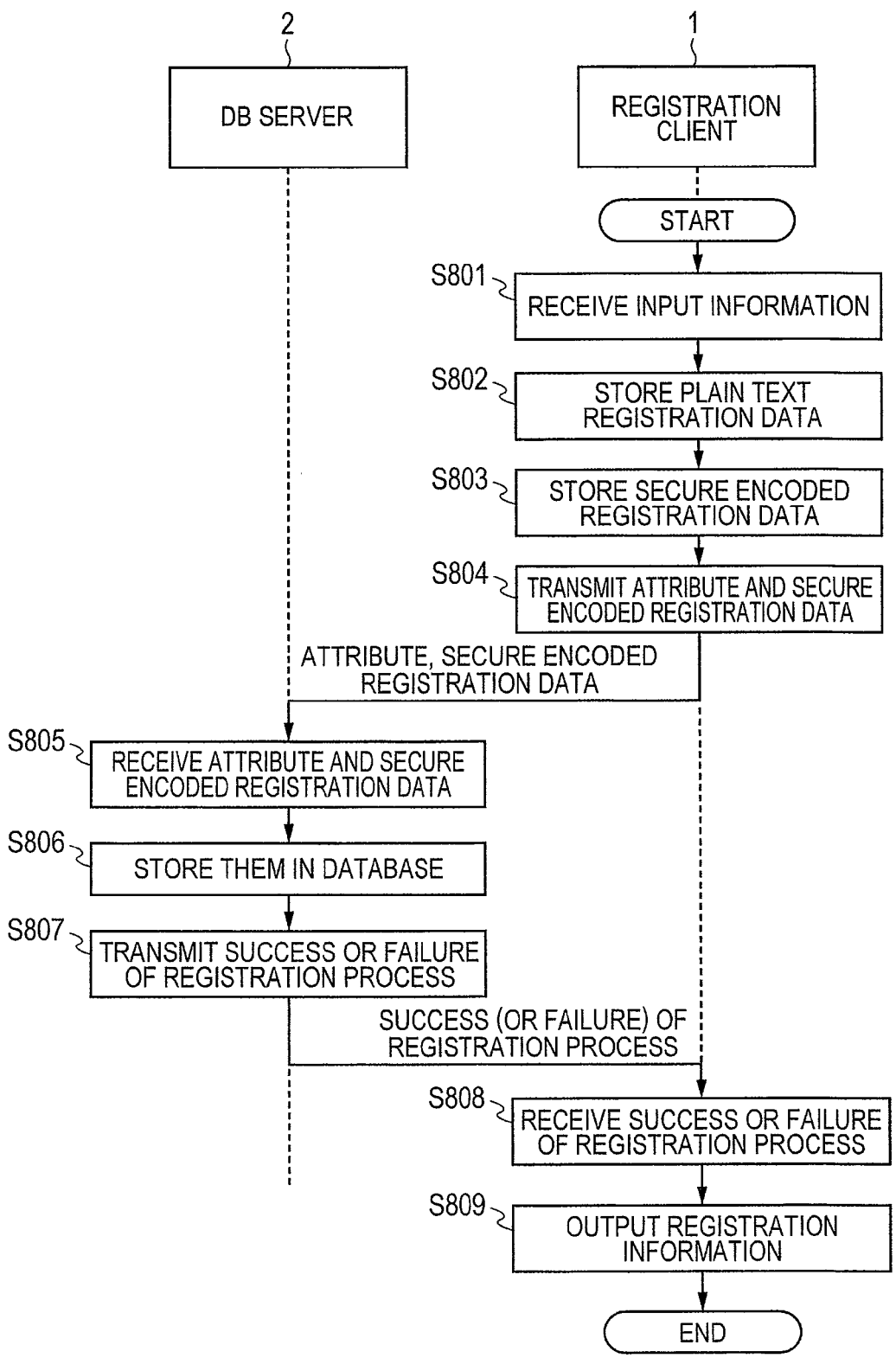

FIG. 9A

| NUMBER | NAME | EMAIL | DEPARTMENT | ... | ... |
|---|---|---|---|---|---|
| $d_0$ | $d_1$ | $d_2$ | $d_3$ | ... | $d_{k-1}$ |
| $d_k$ | $d_{k+1}$ | $d_{k+2}$ | $d_{k+3}$ | ... | $d_{2k-1}$ |
| $d_{2k}$ | $d_{2k+1}$ | $d_{2k+2}$ | $d_{2k+3}$ | ... | $d_{3k-1}$ |
| $d_{3k}$ | $d_{3k+1}$ | $d_{3k+2}$ | $d_{3k+3}$ | ... | $d_{4k-1}$ |
| ... | ... | ... | ... | ... | ... |

901 (ATTRIBUTE)
902 (SECURE ENCODED REGISTRATION DATA)

FIG. 9B

| NUMBER | NAME | EMAIL | DEPARTMENT | ... | ... |
|---|---|---|---|---|---|
| $d_0$ | $d_1$ | $d_2$ | $d_3$ | ... | $d_{k-1}$ |
| $d_k$ | $d_{k+1}$ | $d_{k+2}$ | $d_{k+3}$ | ... | $d_{2k-1}$ |
| $d_{2k}$ | $d_{2k+1}$ | $d_{2k+2}$ | $d_{2k+3}$ | ... | $d_{3k-1}$ |
| $d_{3k}$ | $d_{3k+1}$ | $d_{3k+2}$ | $d_{3k+3}$ | ... | $d_{4k-1}$ |
| ... | ... | ... | ... | ... | ... |

901 (ATTRIBUTE)
902 (SECURE ENCODED REGISTRATION DATA)

SEARCHABLE ENCRYPTION PROCESSING SYSTEM

FIELD OF THE INVENTION

The present invention relates to a searchable encryption processing system in which a server searches for deposited encrypted data without decrypting the encrypted data in response to a client request, in a server/client model.

BACKGROUND OF THE INVENTION

In recent years, for the purpose of development effectiveness of the information system and operation control cost, an operation control system (so-called a cloud system), attracts lots of attention. This system uses an information system provided by another organization, without maintaining its own information system. In the cloud system, an organization which controls the information system differs from the organization which uses the information system. Thus, it is difficult for the organization itself to make a scheme to prevent information leakage, a scheme to investigate the cause of an accident occurrence, and a scheme to prevent recurrence. As a scheme for data leakage prevention, it is necessary to maintain data confidentiality with the utilization of the encryption technology.

In a known system using the encryption technology in the server/client model, while the client deposits data in the server, information leakage of the deposited data to the server is prevented. For example, Non-patent document 1 and Non-patent document 2 disclose a search processing system for searching for the deposited encrypted data without decrypting the encrypted data, in response to a client request. This search processing system uses a probabilistic encryption method in which plaintext and ciphertext have a complicated relationship of one-to-"m"correspondence to each other. This probabilistic encryption method is more secure than a deterministic encryption method in which plaintext and ciphertext have a simple relationship of one-to-one correspondence to each other. According to the proposed technology, the data deposited in the server can securely be searched, while preventing information leakage to the server administrator.

PRIOR ART DOCUMENT

Non-Patent Document

Non-patent document 1: Dawn Xiaodong Song, David Wagner, Arian Perrig. "Practical Techniques for Searches on Encrypted Data". In Proceedings of the 2000 IEEE Symposium on Security and Privacy, pages 44-55 (2000).

Non-patent document 2: Zhiqiang Yang, Sheng Zhong, Rebecca N. Wright. "Privacy-Preserving Queries on Encrypted Data". In Proceedings of the 11$^{th}$ European Symposium on Research in Computer Security (Esorics), Volume 4189 of Lecture Notes in Computer Science, pages 476-495 (2006).

SUMMARY OF THE INVENTION

Problem to be Solved by the Invention

However, according to the technologies disclosed in Non-patent document 1 and Non-patent document 2, the operation control and the client/server system are both complicated, though they are necessary for decrypting the data which has been encrypted using the probabilistic encryption method and deposited in the server. Further, the probabilistic encryption method using a pseudo-random number is effective until the client performs the searching. However, after the searching, the mask of the pseudo-random number in the searched encrypted data is removed. This results in lowering security of the ciphertext, that is, results in the deterministic encryption from the probabilistic encryption to. Because the client uses the low secure deterministic encryption method for encryption of a search request (search query), the system is vulnerable to attacks, such as frequency analysis, and the like.

Means for Solving the Problem

To solve the above problem, the searchable encryption processing system includes a DB server in which data is deposited, a registration client which deposits data into the DB server, and a search client which makes the DB server to search for the data. The server and the clients cooperate with each other through a network. The registration client deposits the encrypted data securely in the server, in accordance with the probabilistic encryption method using a mask having a hash value and an output value of a homomorphic function. The search client uses the probabilistic encryption method with the mask using the homomorphic function for outputting the same value from a plurality of different input values, for encrypting a search query. In according with the probabilistic encryption method, the search client outputs, as a searched result, data not corresponding to the search query, while preventing the DB server from removing the mask and also preventing that the frequency of appearance of data corresponding to the search is leaked out to the DB server.

Effect of the Invention

After the client performs the searching using the DB server, the data corresponding to the search is encrypted in accordance with the probabilistic encryption, thus attaining high security. Without forcing the client to perform the complicated operation control, the encrypted data can efficiently be decrypted.

BRIEF DESCRIPTION OF THE DRAWINGS

FIG. 8 is a sequence diagram exemplifying a process in which the registration client registers the secure encoded registration data into a DB server.

FIG. 9A is a diagram exemplifying a management state of a database which is stored in a database memory unit of the DB server.

FIG. 9B is a diagram exemplifying a search procedure of the database stored in the database memory unit of the DB server.

DETAILED DESCRIPTION OF THE PREFERRED EMBODIMENT

A preferred embodiment of the present invention will now specifically be described based on the drawings.

Figure 1:
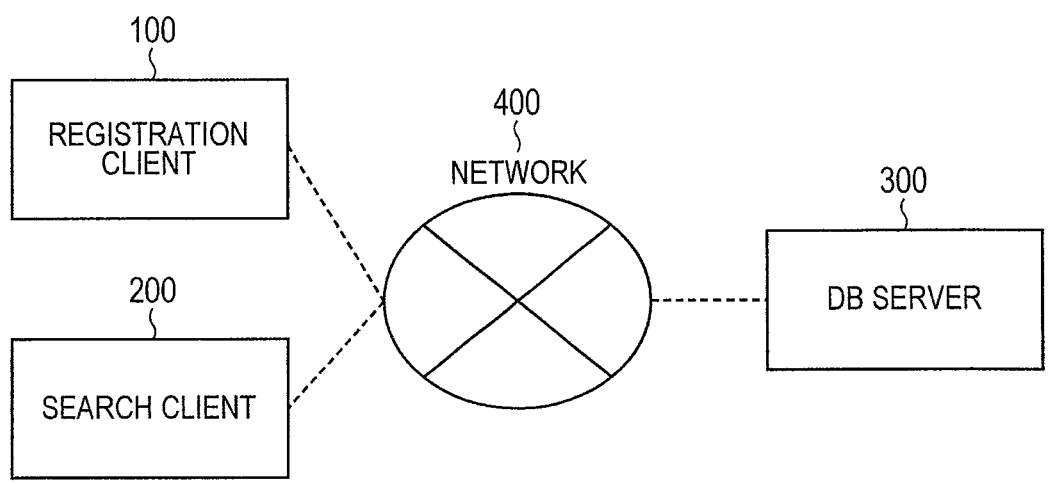
FIG. 1 is a diagram schematically exemplifying a searchable encryption processing system.

FIG. 1 is a schematic diagram of a search processing system according to the present invention. As illustrated, the search processing system includes a registration client 100, a search client 200, and a DB server 300. The registration client 100 and the DB server 300, and also the search client 200 and the DB server 300 are configured to mutually transmit and receive information through a network 400.

The registration client 100 in this embodiment functions as a transmitting/receiving unit (for data registration) for transmitting secure encoded data to a DB server 300. The search client 200 functions as a transmitting/receiving unit (for searching) for transmitting the secure encoded search query to the DB server 300 and receiving a searched result. The DB server 300 functions as a transmitting/receiving unit (for DB management) for storing secure encoded data into a database and for searching the database for data.

Figure 2:
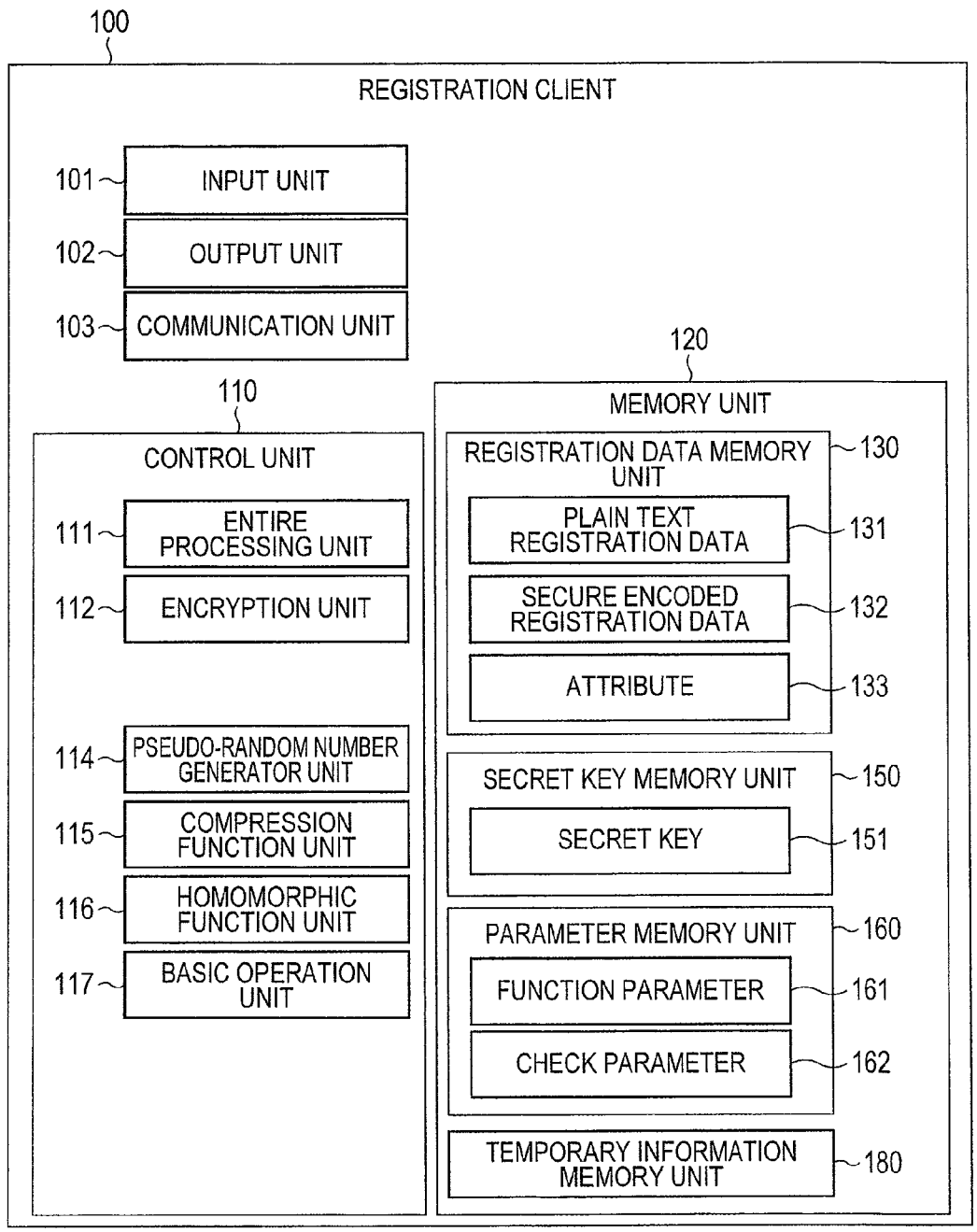
FIG. 2 is a diagram schematically exemplifying functions of a registration client.

FIG. 2 is a functional schematic diagram of the registration client 100. As illustrated, the registration client 100 includes a control unit 110, a memory unit 120, an input unit 101, an output unit 102, and a communication unit 103.

The memory unit 120 includes a registration data memory unit 130, a secret key memory unit 150, a parameter memory unit 160, and a temporary information memory unit 180.

The registration data memory unit 130 stores information specifying transmission text as data to be transmitted to the DB server 300. In this embodiment, this information to be stored includes information specifying plaintext registration data 131 received through the input unit 101, information specifying secure encoded registration data 132 to be registered into the DB server 300, and information specifying attributes of the plaintext registration data 131 and the secure encoded registration data 132.

The secret key memory unit 150 stores information specifying a secret key 151 to be managed by the registration client 100 in secret from the standpoint of security. In this embodiment, the stored information specifies a secret key 151 to be input to an encryption unit 112, a secret key 151 to be input to a pseudo-random number generator unit 114, and a secret key 151 to be input to a compression function unit 115.

The parameter memory unit 160 stores information specifying parameters for use in hiding data. In this embodiment, the stored information specifies a function parameter 161 to be input to a homomorphic function unit 116 and a check parameter 162 to be input to a basic operation unit 117. From the standpoint of security, the function parameter 161 is information to be managed by the registration client 100 in secret.

The temporary information memory unit 180 stores information necessary for processes of the control unit 110.

The control unit 110 includes an entire processing unit 111, an encryption unit 112, the pseudo-random number generator unit 114, the compression function unit 115, the homomorphic function unit 116, and the basic operation unit 117.

The entire processing unit 111 controls the entire processes of the registration client 100.

For example, in this embodiment, the entire processing unit 111 performs a process for storing received information input through the input unit 101 into the registration data memory unit 130, as the plaintext registration data 131.

In this embodiment, the entire processing unit 111 performs a process for displaying the plaintext registration data 131 on the output unit 102.

In this embodiment, the entire processing unit 111 reads the plaintext registration data 131 stored in the registration data memory unit 130, inputs the data to the encryption unit 112, the pseudo-random number generator unit 114, the compression function unit 115, the homomorphic function unit 116, and the basic operation unit 117, and performs a process for storing the output data into the registration data memory unit 130 as secure encoded registration data 132.

In this embodiment, the entire processing unit 111 performs a process for transmitting an attribute 133 and the secure encoded registration data 132 to the DB server 300 through the communication unit 103.

Further, in this embodiment, the entire processing unit 111 performs a process for storing the attribute 133 and the secure encoded registration data 132 received from the DB server 300 through the communication unit 103 in the temporary information memory unit 180 and a process for displaying the same on the output unit 102.

The encryption unit 112 performs a process for outputting data which has been obtained by encrypting the input data.

For example, in this embodiment, the data and the secret key 151 are input from the entire processing unit 111, and a process for outputting the encrypted data is performed using the secret key 151.

For example, the encryption unit 112 is realized by implementing a standard encryption algorithm.

The pseudo-random number generator unit 114 performs a process for outputting a pseudo-random number.

For example, the pseudo-random number generator unit 114 outputs a random number, based on some physical phenomena, such as the temperature, the time, and the electric energy.

In this embodiment, the pseudo-random number generator unit 114 outputs a pseudo-random number, using the secret key 151 input from the entire processing unit 111. The data value of the secret key 151 is updated to a new data value, and then stored in the secret key memory unit 150 by the entire processing unit 111.

For example, the pseudo-random number generator unit 114 is realized by implementing a standard pseudo-random number generation algorithm.

The compression function unit 115 performs a process for outputting data which has been obtained by compressing the input data.

For example, in this embodiment, a process is performed for converting the data input from the entire processing unit 111 into another data with a fixed length (h bits) and outputting the data.

For example, the compression function unit 115, which converts input data with an arbitrary length into data with a fixed length, can be realized by implementing a standard encryption hash function algorithm.

The homomorphic function unit 116 performs a process for outputting an output result of a functional calculation on the input data, as data.

For example, in this embodiment, a process is performed for converting an output value of the functional calculation into data with a fixed value (f bits) expressed in a binary string, using the function parameter 161 input from the entire processing unit 111. In this process, the data input from the entire processing unit 111 is assumed as an input value of a function having a homomorphic property.

Note that the homomorphic function is a function in which Equation (1) is satisfied, for a function F, an input variable x, and an input variable y.

$$F(x \cdot y) = F(x) ? F(y) \tag{1}$$

Note that symbols "•" and "?" represent arithmetic symbols, and are substituted by arithmetic symbols such as an arithmetic symbol for addition "+", an arithmetic symbol for multiplication "*", and an arithmetic symbol "xor" for XOR (eXcLusive OR) arithmetic for each bit.

In this embodiment, descriptions will be made to a case, when the XOR arithmetic symbol "xor" is substituted for the symbols "•" and "?", that is, when Equation (2) is satisfied.

$$F(x \text{xor} y) = F(x) \text{xor} F(y) \tag{2}$$

Note that this embodiment is applicable also when the homomorphic function is satisfied by any other arithmetic symbols of Equation (2).

The homomorphic function unit 116 is realized by implementing an algorithm for realizing the homomorphic function.

The basic operation unit 117 performs processes regarding basic arithmetic operations, such as addition, subtraction, and comparison operation.

For example, in this embodiment, the basic operation unit 117 performs a process for outputting data representing a verification result indicating whether or not equality in the XOR arithmetic operation or the comparison operation is satisfied. The XOR arithmetic operation is an exclusive OR operation for each bit from two data input from the entire processing unit 111.

Figure 5:
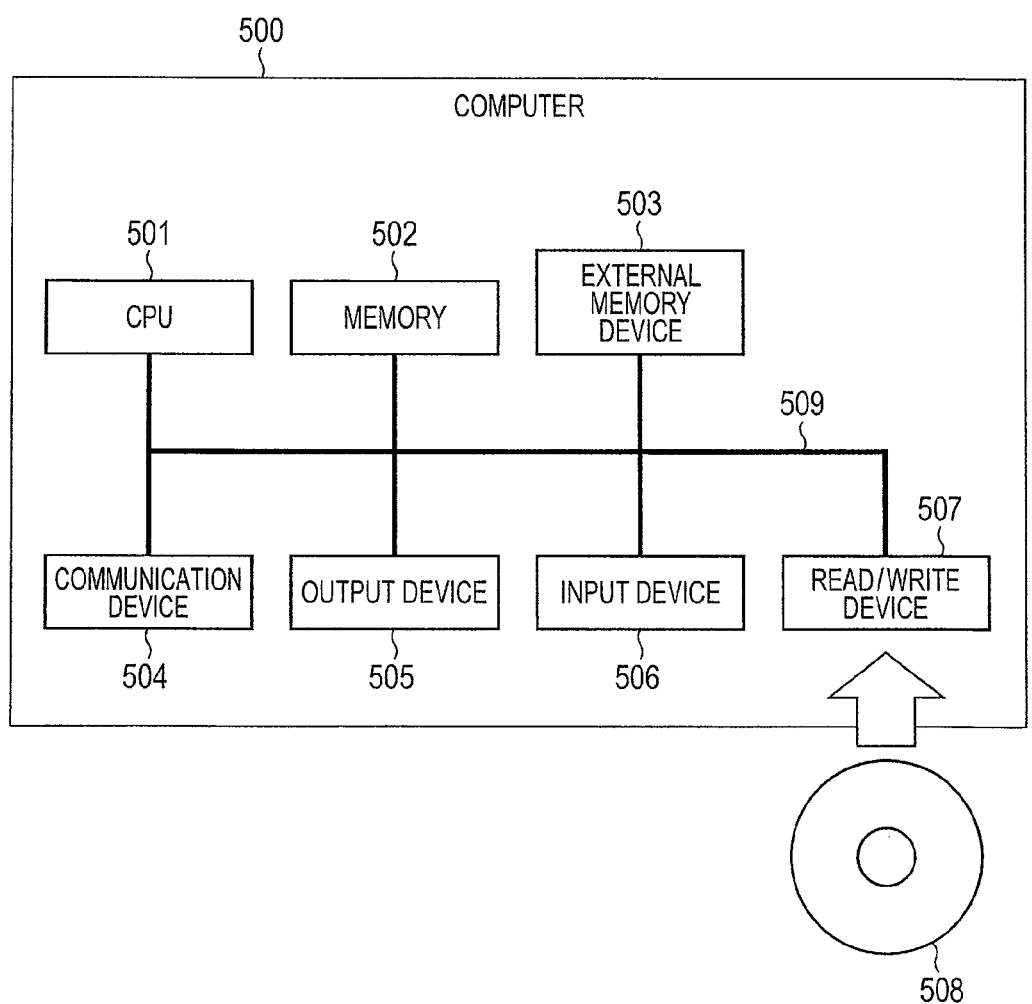
FIG. 5 is a diagram exemplifying a schematic configuration of a computer.

The above-described registration client 100 can be realized using a general computer 500, as illustrated in FIG. 5 (schematic diagram of the computer). The computer includes a CPU (Central Processing Unit) 501, a memory 502, an external memory device 503 including an HDD (Hard Disk Drive), a read/write device 507, an input device 506 (a keyboard or a mouse), an output device 505 (a display), a communication device 504 (a NIC (Network Interface Card) for connecting to a communication network), and an internal communication line (called "a system bus" connecting these). Note that the read/write device 507 reads/writes information from/to a portable recording medium 508, such as a CD (Compact Disk) or DVD (Digital Versatile Disk).

For example, the memory unit 120 can be realized by the CPU 501 using the memory 502 or the external memory device 503. The control unit 110 and each process unit included in the control unit 110 can be realized by loading a predetermined program stored in the external memory device 503 into the memory 502 and executing it with the CPU 501. The input unit 101 can be realized by the CPU 501 using the input device 506. The output unit 102 can be realized by the CPU 501 using the output device 505. The communication unit 103 can be realized by the CPU 501 using the communication device 504.

The predetermined program is recorded (downloaded) into the external memory device 503 from the recording medium 508 through the read/write device 507, or from the network through the communication device 504. Then, the program may be loaded in the memory 502, and executed by the CPU 501. The program may directly be loaded in the memory from the recording medium 508 or from the network through the communication device 504, and executed by the CPU 501.

Figure 3:
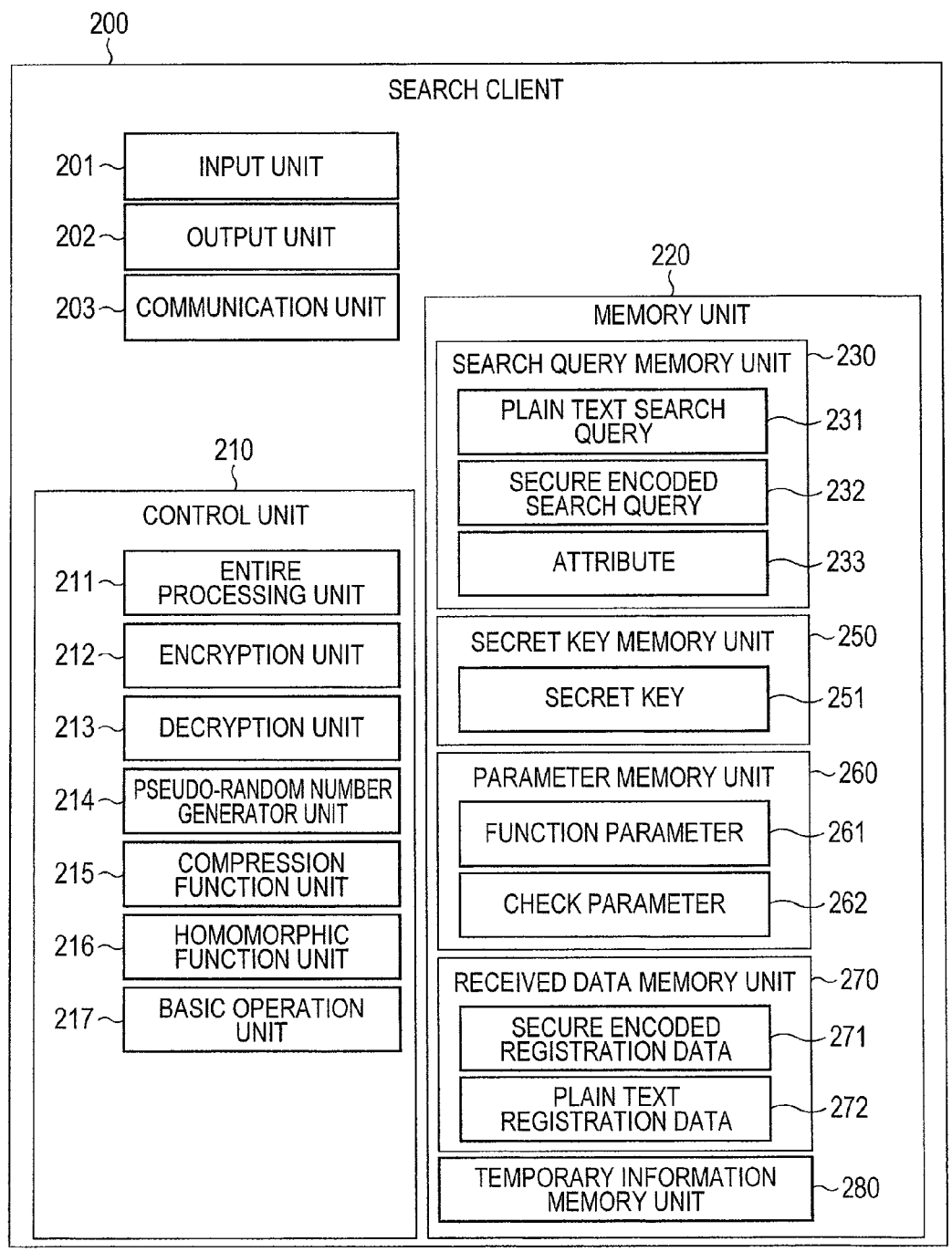
FIG. 3 is a diagram schematically exemplifying functions of a search client.

FIG. 3 is a functional schematic diagram of the search client 200. As illustrated, the search client 200 includes a control unit 210, a memory unit 220, an input unit 201, an output unit 202, and a communication unit 203.

The memory unit 220 includes a search query memory unit 230, a secret key memory unit 250, a parameter memory unit 260, a received data memory unit 270, and a temporary information memory unit 280.

The search query memory unit 230 stores information specifying transmission text as data to be transmitted to the DB server 300. In this embodiment, the unit 230 stores information specifying a plaintext search query 231 received through the input unit 201, a secure encoded search query 232 to be transmitted to the DB server 300, and information specifying attributes 233 of the plaintext search query 231 and the secure encoded search query 232.

The secret key memory unit 250 stores information specifying a secret key 251 to be managed in secret by the search client 200 from the standpoint of security. In this embodiment, the unit stores information specifying a secret key 251 to be input to an encryption unit 212, a secret key 251 to be input to a decryption unit 213, a secret key 251 to be input to a pseudo-random number generator unit 214, and a secret key 251 to be input to a compression function unit 215.

The parameter memory unit 260 stores information specifying a parameter for use in hiding data and canceling the hiding of the data. In this embodiment, the unit stores information specifying a function parameter 261 to be input to a homomorphic function unit 216 and information specifying a text parameter 262 to be input to a basic operation unit 217. From the standpoint of security, the function parameter 261 is information to be managed by the search client 200 in secret.

The received data memory unit 270 stores information specifying data received through the communication unit 203. In this embodiment, the received data memory unit 270 stores information specifying data received from the DB server 300 through the communication unit 203, as secure encoded registration data 271. A process is performed for storing data which has been obtained by removing the hiding property from the secure encoded registration data 271, in the received data memory unit 270, as plaintext registration data 272.

The temporary information memory unit 280 stores information necessary for a process of the control unit 210.

The control unit 210 includes an entire processing unit 211, the encryption unit 212, the decryption unit 213, the pseudo-random number generator unit 214, the compression function unit 215, the homomorphic 216, and the basic operation unit 217.

The entire processing unit 211 controls the entire processes of the search client 200.

For example, in this embodiment, the entire processing unit 211 performs a process for storing information received and input through the input unit 201 into the search query memory unit 230, as the plaintext search query 231.

In this embodiment, the entire processing unit 211 performs a process for displaying the plaintext search query 231 on the output unit 202.

In this embodiment, the entire processing unit 211 reads the plaintext search query 231 stored in the search query memory unit 230. The unit inputs it to the encryption unit 212, the pseudo-random number generator unit 214, the compression function unit 215, the homomorphic function unit 216, and the basic operation unit 217. Then, the unit performs a process for storing output data into the search query memory unit 230 as the secure encoded search query 232.

In this embodiment, the entire processing unit 211 performs a process for transmitting the attributes 233 and the secure encoded search query 232 to the DB server 300.

In this embodiment, the entire processing unit 211 performs a process for receiving the secure encoded registration data 271 from the DB server 300 through the communication unit 203.

In this embodiment, the entire processing unit 211 performs a process for storing the received secure encoded registration data 271 into the received data memory unit 270 as the secure encoded registration data 271 through the communication unit 203.

In this embodiment, the entire processing unit 211 reads the secure encoded registration data 271 stored in the received data memory unit 270. The unit 211 inputs the read data into the decryption unit 213, the compression function unit 215, the homomorphic function unit 216, and the basic operation unit 217. Then, the unit performs a process for storing output data into the received data memory unit 270 as the plaintext registration data 272.

In this embodiment, the entire processing unit 211 performs a process for displaying the plaintext registration data 272 onto the output unit 202.

Further, the entire processing unit 211 performs a process for storing data received from the DB server 300 through the communication unit 203, and performs a process for displaying the data on the output unit 202.

The encryption unit 212 performs a process for data which has been obtained by encrypting the input data.

For example, in this embodiment, data and the secret key 251 are input from the entire processing unit 211, and a process is performed for outputting encrypted data using the secret key 251.

The decryption unit 213 performs a process for outputting the data which has been obtained by decrypting the input data.

For example, in this embodiment, data and the secret key 251 are input from the entire processing unit 211, and a process is performed for outputting the decrypted data using the secret key 251.

The pseudo-random number generator unit 114 performs a process for outputting a pseudo-random number.

For example, the pseudo-random number generator unit 214 outputs a random number, based on some physical phenomena, such as the temperature, the time, and the electric energy.

In this embodiment, the pseudo-random number generator unit 214 outputs a pseudo-random number using the secret key 251 input from the entire processing unit 211. The data value of the secret key 251 is updated to a new data value, and is stored by the entire processing unit 211 again in the secret key memory unit 250.

For example, in this embodiment, a process is performed for outputting a pseudo-random number, using the secret key 251 input from the entire processing unit 211.

The compression function unit 215 performs a process for outputting data which has been obtained by compressing the input data.

For example, in this embodiment, a process is performed for converting the data input from the entire processing unit 211 into another data with a fixed length (h bits) and outputting the data.

The homomorphic function unit 216 performs a process for outputting an output result of a functional calculation on the input data, as data.

For example, in this embodiment, a process is performed for converting an output value of the functional calculation into data with a fixed value (f bits) expressed in a binary string, using the function parameter 161 input from the entire processing unit 211. In this process, the data input from the entire processing unit 111 is assumed as an input value of a function having a homomorphic property.

Note that the homomorphic function indicates a function in which Equation (2) is satisfied, for a function F, an input variable x, and an input variable y. However, this embodiment is applicable also when the homomorphic property is satisfied by any other arithmetic symbols other than the XOR arithmetic operation for each bit.

The basic operation unit 217 performs processes regarding basic arithmetic operations, such as addition, subtraction, and comparison operation.

For example, in this embodiment, the basic operation unit 217 performs a process for outputting a subtracted result of binary values (binary numbers) of two data input from the entire processing unit 211, as data.

The above-described search client 200 can be realized using a general computer, as illustrated in FIG. 5 (schematic diagram of the computer). The computer includes the CPU 501, the memory 502, the external memory device 503 including an HDD, the read/write device 507 which reads/writes information from/to the portable recording medium 508, such as a CD or DVD, the input device 506 (a keyboard or a mouse), the output device 505 (a display), the communication device 504 (a NIC for connecting to a communication network), and an internal communication line (referred to as a system bus) (a system bus) for connecting these.

For example, the memory unit 220 can be realized by the CPU 501 using the memory 502 or the external memory device 503. The control unit 110 and each process unit included in the control unit 110 can be realized by loading a predetermined program stored in the external memory device 503 into the memory 502 and executing it with the CPU 501. The input unit 201 can be realized by the CPU 501 using the input device 506. The output unit 202 can be realized by the CPU 501 using the output device 505. The communication unit 103 can be realized by the CUP 501 using the communication device 504.

The predetermined program is stored (downloaded) in the external memory device 503 from the recording medium 508 through the read/write device 507, or from the network through the communication device 504. Then, the program may be loaded in the memory 502, and executed by the CPU 501. The program may directly be loaded in the memory from the recording medium 508 or from the network through the communication device 504, and executed by the CPU 501.

Figure 4:
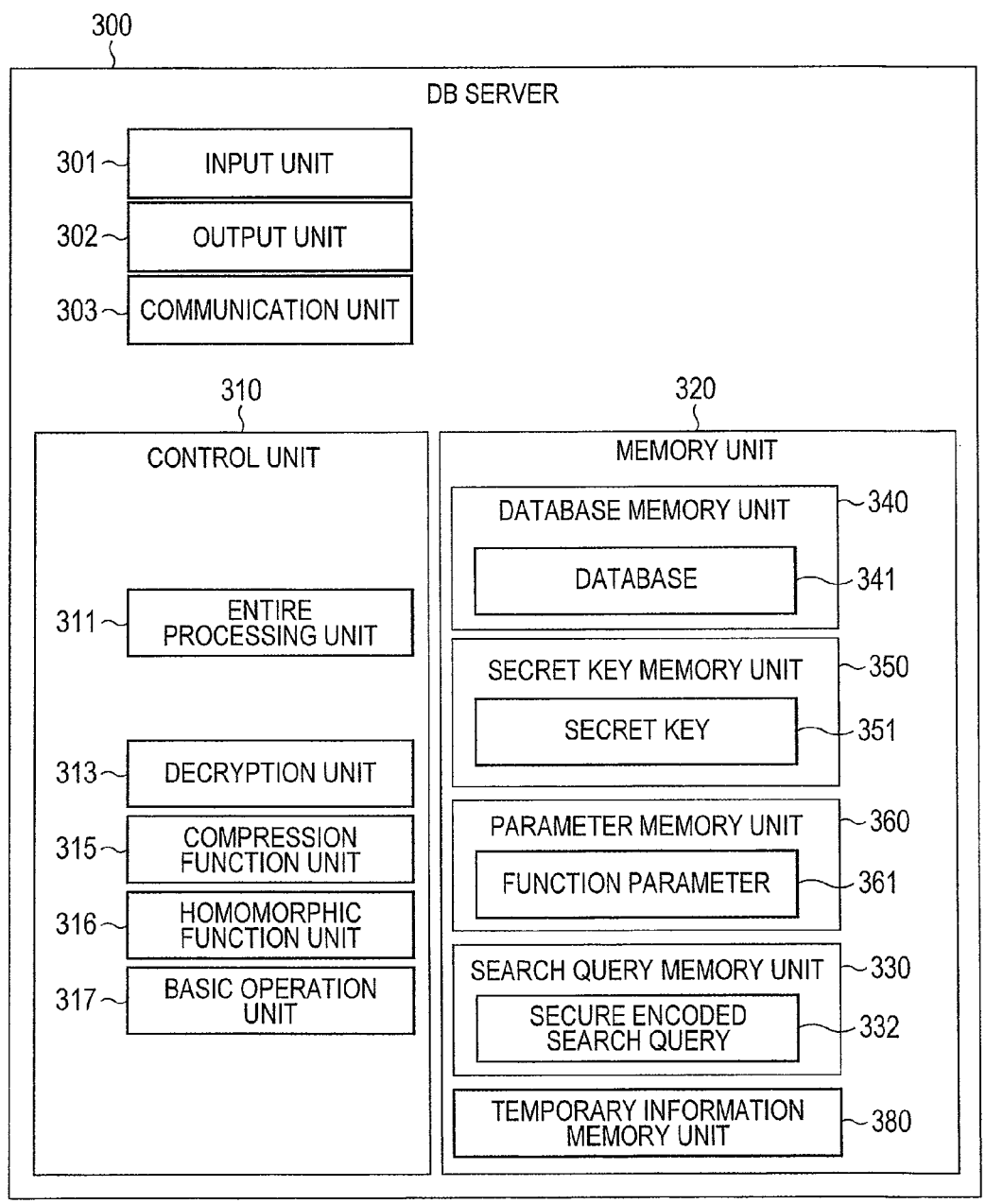
FIG. 4 is a diagram schematically exemplifying functions of a DB server.

FIG. 4 is a functional schematic diagram of the DB server 300. As illustrated, the DB server 300 includes a control unit 310, a memory unit 320, an input unit 301, an output unit 302, and a communication unit 303.

The memory unit 320 includes a parameter memory unit 360, a secret key memory unit 350, a database memory unit 340, a search query memory unit 330, and a temporary information memory unit 380.

The parameter memory unit 360 stores information specifying a parameter for use in checking the relationship between a secure encoded search query 332 and a database 341. In this embodiment, the information specifies a function parameter 361 to be input to a homomorphic function unit 316. From the standpoint of security, the function parameter 361 should be managed by the DB server 300 in secret.

The secret key memory unit 350 stores information specifying the secret key 351 to be managed by the DB server 300 in secret from the standpoint of security. In this embodiment, the stored information specifies the secret key 351 to be input to a decryption unit 313.

The database memory unit 340 stores information specifying registration data received through the communication unit 303. In this embodiment, a process is performed for storing the information received from the registration client 100 through the communication unit 303, as constituent information of the database 341, in the database memory unit 340.

The search query memory unit 330 stores information specifying a search query received through the communication unit 303. In this embodiment, a process is performed for storing the information received from the search client 200 through the communication unit 303 in the search query memory unit 330, as the secure encoded search query 332.

The temporary information memory unit 380 stores information necessary for processes of the control unit 310.

The control unit 310 includes an entire processing unit 311, the decryption unit 313, a compression function unit 315, the homomorphic function unit 316, and a basic operation unit 317.

The entire processing unit 311 controls the entire processes of the DB server 300.

For example, in this embodiment, the entire processing unit 311 performs a process for receiving the secure encoded registration data 131 through the communication unit 303 from the registration client 100.

In this embodiment, the entire processing unit 311 performs a process for storing the secure encoded registration data 131 received through the communication unit 303 into the database memory unit 340 as constituent information of the database 341.

In this embodiment, the entire processing unit 311 performs a process for receiving the secure encoded search query 332 from the search client 200 through the communication unit 303.

In this embodiment, the entire processing unit 311 performs a process for storing the secure encoded search query 332 received through the communication unit 303 into the search query memory unit 330.

In this embodiment, the entire processing unit 311 reads the secure encoded search query 332 stored in the search query memory unit 330. The unit inputs the read query to the decryption unit 313, the compression function unit 315, the homomorphic function unit 316, and the basic operation unit 317. Then, the unit performs a process for transmitting output data to the search client 200 through the communication unit 303.

Further, the entire processing unit 311 performs a process for storing information regarding the data received from the search client 200 or the registration client 100 through the communication unit 303, and performs a process for displaying the information on the output unit 302.

The decryption unit 313 performs a process for outputting data which has been obtained by decrypting the input data.

For example, in this embodiment, data and the secret key 351 are input from the entire processing unit 311, and a process is performed for outputting the decrypted data using the secret key 351.

The compression function unit 315 performs a process for outputting data which has been obtained by compressing the input data.

For example, in this embodiment, a process is performed for converting data input from the entire processing unit 311 into another data with a fixed length (h bits) and outputting the data.

The homomorphic function unit 316 performs a process for outputting an output result of a functional result on the input data, as data.

For example, in this embodiment, a process is performed for converting an output value of the functional calculation into data with a fixed value (f bits) expressed in a binary string, using the function parameter 361 input from the entire processing unit 311. In this process, the data input from the entire processing unit 311 is assumed as an input value of a function having a homomorphic property.

Note that the homomorphic function is a function in which Equation (2) is satisfied, for a function F, an input variable x, and an input variable y. This embodiment is applicable also when the homomorphic property is satisfied by any other arithmetic symbols other than the XOR operation for each bit.

The basic operation unit 317 performs processes regarding basic arithmetic operations, such as addition, subtraction, and comparison operation.

For example, in this embodiment, the basic operation unit 317 performs a process for outputting a subtracted result of binary values (binary numbers) of two data input from the entire processing unit 311, as data.

In this embodiment, the basic operation unit 317 performs a process for outputting a comparison result of binary values (binary numbers) of two data input from the entire processing unit 311, as data.

The above-described DB server 300 can be realized using a general computer, as illustrated in FIG. 5 (schematic diagram of the computer). The computer includes the CPU 501, the memory 502, the external memory device 503 including an HDD, the read/write device 507 which reads/writes information from/to a portable recording medium 508, such as a CD or DVD, the input device 506 (a keyboard or a mouse), the output device 505 (a display), the communication device 504 (a NIC) for connecting to a communication network, and an internal communication line (called a system bus) (a system bus) connecting these.

For example, the memory units 120, 220, and 320 can be realized by the CPU 501 using the memory 502 or the external memory device 503. The control units 110, 210, and 310 and each processing unit included in the control units 110, 210, and 310 can be realized by loading a predetermined program stored in the external memory device 503 into the memory 502 and executed by the CPU 501. The input units 101, 201, and 301 can be realized by the CPU 501 using the input device 506. The output units 102, 202, and 302 can be realized by the CPU 501 using the output device 505. The communication units 103, 203, and 303 can be realized by the CPU 501 using the communication device 504.

The predetermined program is stored (downloaded) in the external memory device 503 from the recording medium 508 through the read/write device 507, or from the network through the communication device 504. Then, the program may be loaded in the memory 502, and executed by the CPU 501. The program may directly be loaded in the memory from the recording medium 508 through the read/write device 507 or from the network through the communication device 504, and executed by the CPU 501.

Figure 6:
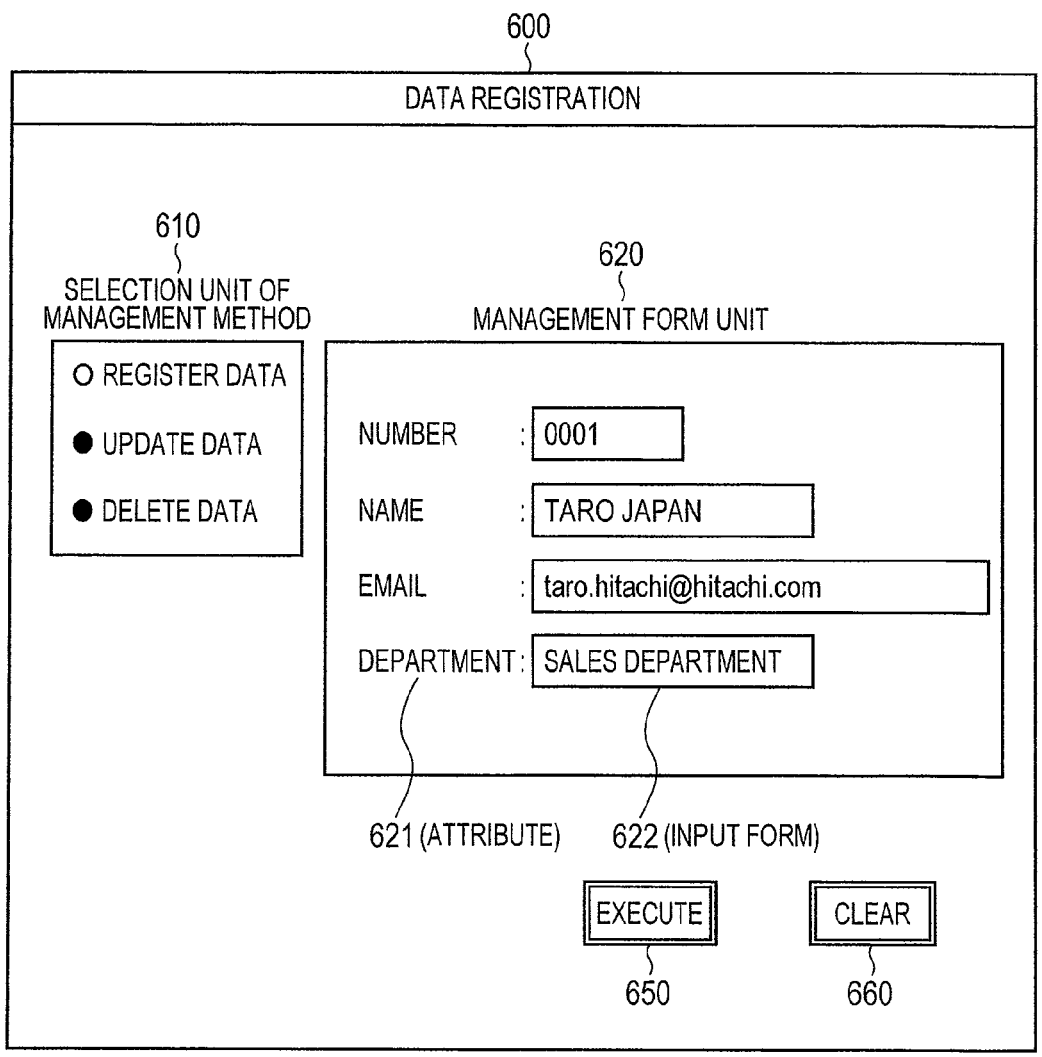
FIG. 6 is a diagram exemplifying displaying contents of an output unit of the registration client.

FIG. 6 is a diagram exemplifying displaying contents 600 of the output unit 102 of the registration client 100. As illustrated, the registration client 100 includes a selection unit 610 for a management method, a management form unit 620, an EXECUTE button 650 representing a button with an indication of "EXECUTE", and a CLEAR button 660 representing a button with an indication of "CLEAR".

The selection unit 610 for the management method is formed of items regarding data registration and specifying data registration, data updating, and data deletion. For example, in this embodiment, the unit includes radio buttons specifying data addition, data updating, and data deletion. Each of the items is selectable through the input unit 101.

The management form unit 620 includes attributes representing types of data and input forms for inputting specific contents of data. The attributes are handled in accordance with items to be specified in the selection unit 610 of the management method. The items include data registration, data updating, or data deletion. For example, in this embodiment, the unit includes attributes 621 and input forms 622. The attributes 621 specify a NUMBER, NAME, EMAIL, and DEPARTMENT. The input forms 622 are designed for inputting the NUMBER, NAME, EMAIL, and DEPARTMENT. The information input in each of the input forms 622 is stored in the temporary information memory unit 180 of the memory unit 120.

The CLEAR button 660 is selectable through the input unit 101. For example, in this embodiment, upon selection of the CLEAR button 660, information input in each of the input forms 622 is deleted.

The EXECUTE button 650 is selectable through the input unit 101. For example, in this embodiment, upon selection of the EXEUTE button 650, the secure encoded registration data 131 is created, based on information input in the item and forms specified in the selection unit 610 of the management method. Then, the created data is transmitted to the DB server 300. Descriptions will now be made to a case in which the item specified in the selection unit 610 of the management method is to "REGISTER DATA". The same process will be performed even when another item of "UPDATE DATA" or "DELETE DATA" is specified.

Process procedures S701 to S715 for the secure encoded registration data 131 are executed upon selection of the "EXECUTE" button 650, when the item "REGISTER DATA" is specified in the selection unit 610 of the management method.

Figure 7A:
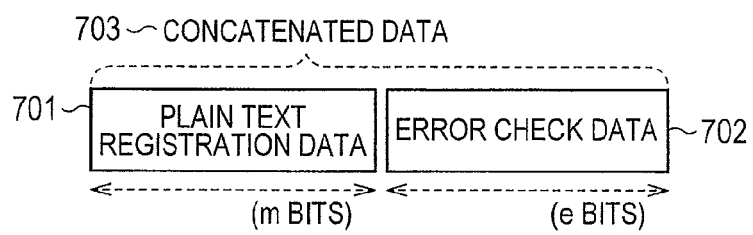
FIG. 7A is a block diagram exemplifying a data configuration of concatenated data created by the registration client.

FIG. 7A is a block diagram exemplifying a data configuration of concatenated data 703 which is created by the registration client 100 based on the information output to the output unit 102, in this embodiment.

Figure 7B:
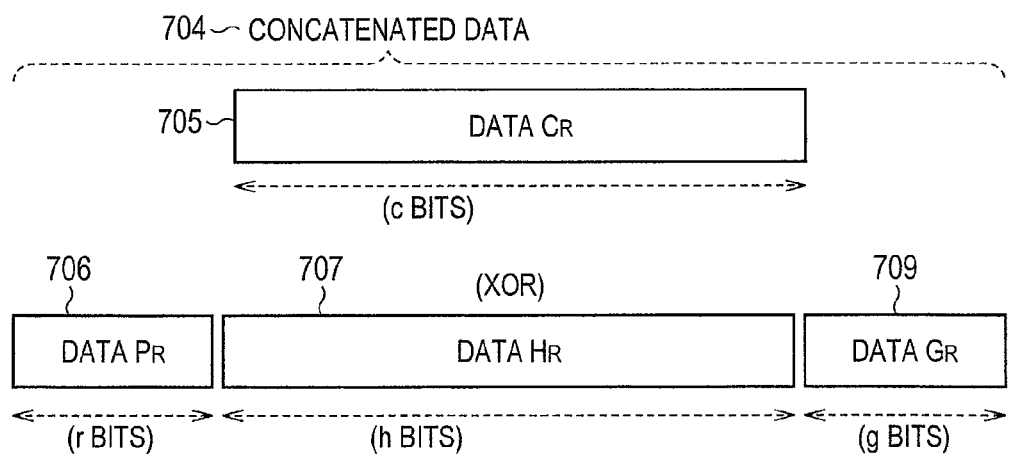
FIG. 7B is a block diagram exemplifying a data configuration of concatenated data crated by the registration client.

FIG. 7B is a block diagram exemplifying a data configuration of concatenated data 704 which is created by the registration client 100 in a process of creating secure encoded registration data 712, in this embodiment.

Figure 7C:
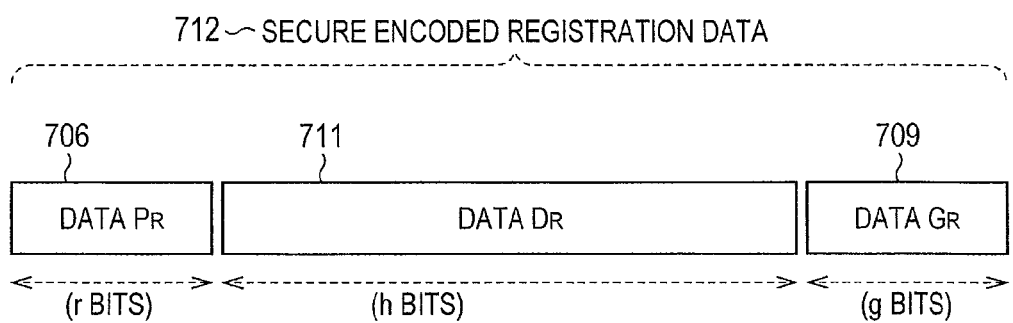
FIG. 7C is a block diagram exemplifying a data configuration of secure encoded registration data created by the registration client.

FIG. 7C is a block diagram showing a data configuration of the secure encoded registration data 712 which is created by the registration client 100, in this embodiment.

Descriptions will now be made to process procedures in which the registration client 100 creates the secure encoded registration data 712 using different data values among respective data creations, without depending on the data value input in the input forms 622, with reference to FIGS. 7A, 7B, and 7C.

The entire processing unit 111 of the registration client 100 performs a process for storing information input in the input form 622 as plaintext registration data 701, in the registration data memory unit 130 of the memory unit 120. At this time, the plaintext registration data 701 is stored in the temporary information memory unit 180 of the registration client 100, as data of m bits expressed as binary data.

The entire processing unit 111 of the registration client 100 reads the check parameter 162 stored in the parameter memory unit 160, and performs a process for outputting it as error check data 702. At this time, the output error check data 702 is stored in the temporary information memory unit 180 of the registration client 100, as data of e bits.

The entire processing unit 111 of the registration client 100 performs a process for concatenating the plaintext registration data 701 and the error check data 702 (S701).

In the concatenating process, divided error check data 702 may be inserted in each part of the plaintext registration data 701. For example, the error check data 702 may be inserted in the head (header) and end (footer) of the plaintext registration data 701. The error check data 702 may be mixed with the plaintext registration data 701, by being multiplied thereby.

As illustrated in FIG. 7A, in the registration client 100, the concatenated data 703 is assumed as one single data, in which the error check data 702 is concatenated with the end of the plaintext registration data 701 input by the entire processing unit 111. At this time, the concatenated data 703 is stored as data of (m+e) bits, in the temporary information memory unit 180 of the registration client 100. The concatenating process is not limited to this process, and any other concatenating process is applicable.

As illustrated in FIG. 7B, descriptions will now be made to a data configuration of the concatenated data 704 created by the registration client 100.

The entire processing unit 111 of the registration client 100 performs a process for inputting the concatenated data 703, as the concatenated data of the plaintext registration data 701 and the error check data 702, and the secret key 151 stored in the secret key memory unit 150, into the encryption unit 112 (S702).

The encryption unit 112 of the registration client 100 performs a process for encrypting the input data and outputting data $C_R$ 705 (S703).

In the registration client 100, the concatenated data 703 input by the entire processing unit 111 is encrypted by the encryption unit 112, and output data is assumed as data $C_R$ 705. At this time, the data $C_R$ 705 is stored as data of c bits, in the temporary information memory unit 180 of the registration client 100 (S704).

The data $C_R$ 705 may depend on the concatenated data 703, that is, input information of the input forms 622. For example, the same data $C_R$ 705 may be output from the concatenated data 703 having the same data value.

The entire processing unit 111 of the registration client 100 reads the secret key 151 from the secret key memory unit 150, and performs a process for inputting the secret key 151 in the pseudo-random number generator unit 114 (S705).

The pseudo-random number generator unit 114 of the registration client 100 performs a process for outputting a pseudo-random number, using the input secret key 151. At this time, the pseudo-random number is stored as data $P_R$ 706 of r bits, in the temporary information memory unit 180 of the registration client 100 (S706).

The pseudo-random number output by the pseudo-random number generator unit 114 does not depend on the concatenated data 703 and the data $C_R$ 705. Thus, without depending on the input information of the input form 622, the data $P_R$ 706 can be created with different data values among respective data creations.

The entire processing unit 111 of the registration client 100 reads the secret key 151 from the secret key memory unit 150, and performs a process for inputting concatenated data of the secret key 151 and the data $P_R$ 706 output from the random number generator unit into the compression function unit 115 (S707).

The compression function unit 115 of the registration client 100 performs a process for converting the input data and outputting a hash value. At this time, the hash value is stored as data $H_R$ 707 of h bits, in the temporary information memory unit 180 of the registration client 100 (S708).

The data $H_R$ 707 can be assumed as a random number, because of the property of the compression function. The data $H_R$ 707 does not depend on the concatenated data 703 and the data $C_R$ 705. Thus, like the data $P_R$ 706, without depending on the input information of the input form 622, data $H_R$ 707 can be created with different data values among respective data creations.

The entire processing unit 111 of the registration client 100 inputs the data $H_R$ 707 and the function parameter 161 stored in the parameter memory unit 160, into the homomorphic function unit 116 (S709).

The homomorphic function unit 116 of the registration client 100 performs a process for outputting a homomorphic function value in which an output value of a functional calculation is expressed in a binary string using the function parameter 161, when the input data is assumed as an input value of the function having a homomorphic property. At this time, the homomorphic function value is stored as data $D_R$ 708 of f bits, in the temporary information memory unit 180 of the registration client 100 (S710).

When the homomorphic function is "func", Equation (3) is satisfied (note that the function parameter 161 is not described), for the data $H_R$ 707 as its input value and the data $F_R$ 708 as the output value.

$$F_R = \text{func}(H_R) \quad (3)$$

The output of the data $F_R$ 708 can be assumed as a random number, when the input data value is a random number, based on the property of the homomorphic function to be processed by the homomorphic function unit 116. The data $F_R$ 708 does not depend on the concatenated data 703 and the data $C_R$ 705. Thus, like the data $H_R$ 707, the data $F_R$ 707 can be created with different data values among respective data creations, without depending on the input information of the input form 622.

The entire processing unit 111 of the registration client 100 performs a process for inputting the data $F_R$ 708 output from the homomorphic function unit 116, into the compression function unit 115 (S711).

The compression function unit 115 of the registration client 100 performs a process for converting the input data and outputting a hash value. At this time, the hash value is stored as data $G_R$ 709 of g bits, in the temporary information memory unit 180 of the registration client 100 (S712).

The data $G_R$ 709 is a random number, because of the property of the compression function. Thus, like the data $F_R$ 707 and the data $H_R$ 707, the data $G_R$ 709 can be created with different data values among respective data creations, without depending on the input information of the input form 622. It is difficult to obtain the reverse mapping, due to the property of the compression function. Thus, registration of the data $G_R$ 709 in the DB server 300 does not have any effect on the security of the data.

FIG. 7C is a block diagram showing a data configuration of the secure encoded registration data 712 which is created by the registration client 100, in this embodiment.

The entire processing unit 111 of the registration client 100 performs a process for inputting the data $H_R$ 707 and the data $C_R$ 705 into the basic operation unit 117 (S713).

The basic operation unit 117 of the registration client 100 performs a process for obtaining an XOR calculation for each bit of the input data $H_R$ 707 and the data $C_R$ 705 and outputting the obtained result as data $D_R$ 711 (S714).

Based on the XOR calculation of S714, the data $H_R$ 707, the data $C_R$ 705, and the data $D_R$ 711 satisfy Equation (4).

$$D_R = H_R \text{ xor } C_R \quad (4)$$

The calculation of S714 is performed using the data $H_R$ 707 having a random number which does not depend on the concatenated data 703 and the data $C_R$ 705. Thus, even when the relationship between the concatenated data 703 and the data $C_R$ 705 is uniquely set, the data $D_R$ 711 with different data values can be obtained, using the data $H_R$ 707 with different data values among respective creations.

The entire processing unit 111 of the registration client 100 concatenates the data $P_R$ 706, the data $D_R$ 711, and the data $G_R$ 709, and performs a process for storing the created data in the registration data memory unit 130, as secure encoded registration data 712 (S715).

The secure encoded registration data 712 includes the data $P_R$ 706, the data $D_R$ 711, and the data $G_R$ 709 as random numbers which do not depend on the concatenated data 703 or the data $C_R$ 705, and result in different data values among respective data creations. As a result, the secure encoded registration data 712 in which the data $P_R$ 706, the data $D_R$ 711, and the data $G_R$ 709 are concatenated together is independent from the concatenated data 703 and the data $C_R$ 705. That is, the secure encoded registration data 712 can be created, resulting in different data values among respective creations, without depending on the input information of the input form 622.

Note that the above-described process procedures are not fixed, and so can be changed. For example, the process procedures S713 and S714 may be changed, and the data $P_R$ 706, the data $H_R$ 707 and the data $G_R$ 709 are concatenated together in S713. After this, the XOR calculation may be performed for the data $H_R$ 707 and the data $C_R$ 705 in S714. Similarly, any other process procedures may be changed.

The control unit 110 in charge of the above-described process is not fixed, and so can be changed. For example, in S711, the data $F_R$ 708 may be input into the encryption unit 112, instead of the compression function unit 115. In S712, data output from the encryption unit 112 may be stored in the temporary information memory unit 180, as the data $G_R$ 709.

The data configuration of the secure encoded registration data 712 may be changed, and the process may be changed as well in accordance with the changed configuration. For example, the information regarding the data $P_R$ 706 may be stored in the memory unit 120, and may not be included in the secure encoded registration data 712. At this time, the data output in S706 is assumed as the data $H_R$ 706, and the procedures of S707 and S708 may be cancelled. At this time, the entire processing unit 111 of the registration client 100 in S715 may concatenate the data $D_R$ 711 and the data $G_R$ 709, as the secure encoded registration data 712.

FIG. 8 is a sequence diagram showing a process in which the registration client 100 registers the secure encoded registration data 132 into the DB server 300 through the network 400, in this embodiment.

The registration client 100 performs a process for storing, into the temporary information memory unit 180, information which has been input from the user into the form through the input unit 101 (S801).

The registration client 100 detects that the user has selected the "EXECUTE" button 650 through the input unit 101, and performs a process for storing the information input in the form as the plaintext registration data 131 into the memory unit 120 (S802).

The registration client 100 creates the secure encoded registration data 132 under the control of the control unit 110, and performs a process for storing the data into the memory unit 120 (S803).

The registration client 100 performs a process for transmitting the attribute 133 and the secure encoded registration data 132 to the DB server 300, from the communication unit 103 through the network 400 (S804).

The DB server 300 performs a process for receiving the attribute 133 and the secure encoded registration data 132 which are transmitted by the registration client 100, from the communication unit 303 through the network 400 (S805).

The DB server 300 performs a process for storing the secure encoded registration data 132 into the memory unit 320 as constituent information of the database 341, using the attribute 133 received by the control unit 310 (S806).

The DB server 300 performs a process for transmitting information about the success or failure of the process for registering the secure encoded registration data 132, from the communication unit 303 to the registration server through the network 400 (S807).

The registration client 100 performs a process for receiving the information about the success or failure of the process for registering the secure encoded registration data 132 from the communication unit 103 through the network 400 (S808). This information is transmitted by the DB server 300.

The registration client 100 performs a process for displaying registration information including the success or failure of the registration process through the output unit 102, to the user (S809).

FIG. 9A is a block diagram exemplifying a management state of the database 341 stored in the database memory unit 340 of the memory unit 320, in the DB server 300.

For example, in this embodiment, in the DB server 300, the database 341 is formed of attributes 901 and secure encoded registration data 902 ($d_0$, $d_1$, $d_2$, ...) in association with the attributes 901. The attributes 901 specify the "NUMBER", "NAME", "EMAIL", and the like.

Figure 10:
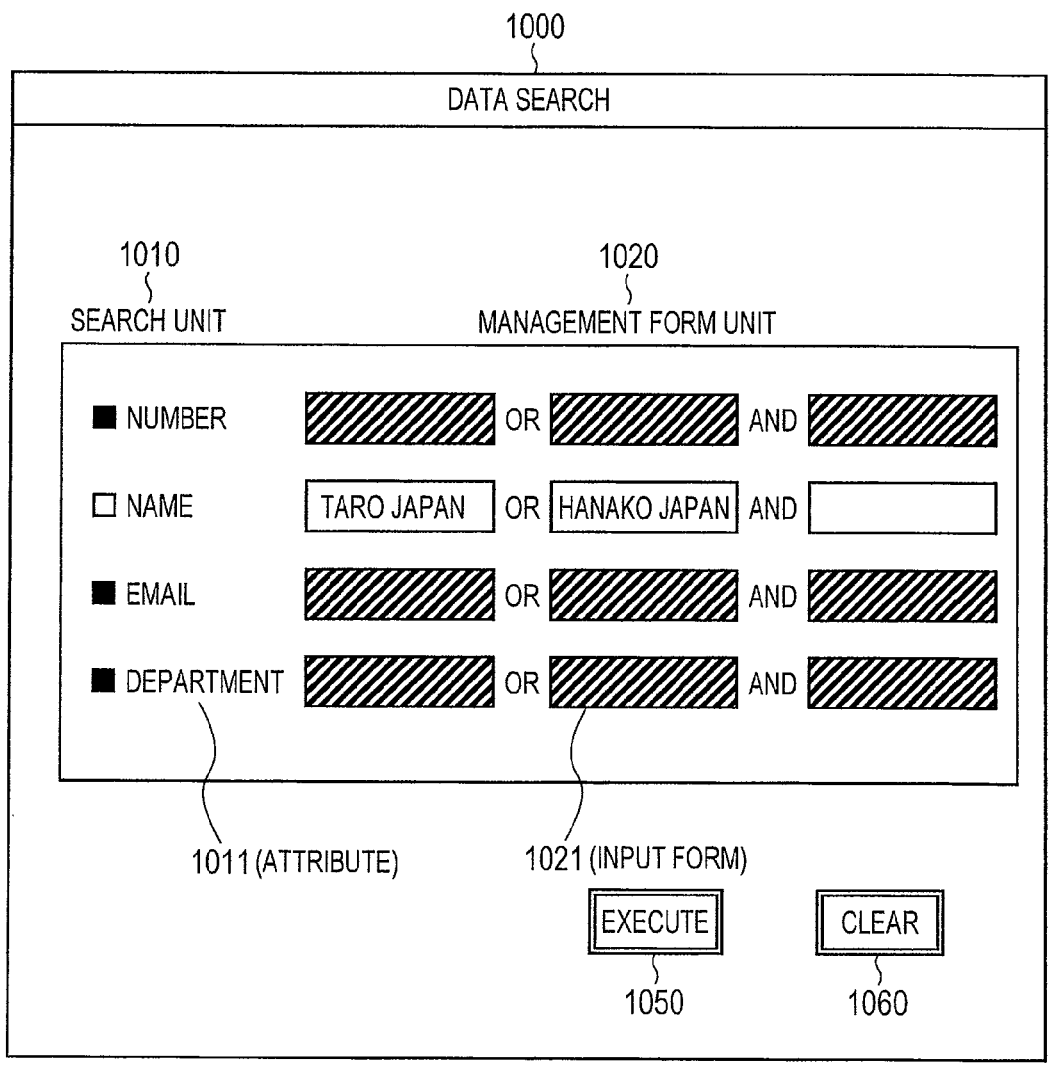
FIG. 10 is a diagram exemplifying displayed contents of an output unit of the search client.

FIG. 10 is a diagram exemplifying displaying contents 1000 on the display unit 202 of the search client 200. As illustrated, the search client 200 includes a search item unit 1010, a search form 1020, a "SEARCH"button 1050 representing a button with an indication of "SEARCH", and a "CLEAR" button 1060 representing a button with an indication of "CLEAR".

The selection unit for the search method is formed of items regarding types of target data to be searched. For example, in this embodiment, the unit includes radio buttons specifying the "NUMBER", "NAME", "EMAIL", and "DEPARTMENT". A plurality of items can be selected through the input unit 201.

The search form unit 1020 is formed of input forms 1022 for inputting specific contents regarding the "NUMBER", "NAME", "EMAIL", and "DEPARTMENT" which are attributes 1011 specified in the selection unit of the search method. For example, in this embodiment, a plurality of input forms 1022 are designed to input the "NUMBER", "NAME", "EMAIL", and "DEPARTMENT". The information input in the input forms 1022 is stored in the temporary information memory unit 280 of the memory unit 220.

The "CLEAR" button 1060 is selectable through the input unit 201. For example, in this embodiment, upon selection of the "CLEAR" button 1060, input information of the input forms 1022 are deleted.

The "SEARCH" button 1050 is selectable through the input unit 201. In this embodiment, upon selection of the "SEARCH" button 1050, a process is performed for creating the secure encoded search query 232 based on the attributes 1011 specified in the selection unit of the search method and the information input into the input forms 1022, and for transmitting it to the DB server 300. Now, descriptions will be made to a case in which only one attribute 1011 (for example, "NAME") is selected in the selection unit of the search method. The same process is also applicable in a case where information is input in a plurality of input forms 1022 and in a case where the plurality of attributes 1011 are selected.

When only one attribute 1011 is specified in the selection unit of the search method, if the "SEARCH"button 1050 has been selected, process procedures S1101 to S112 are performed.

Figure 11A:
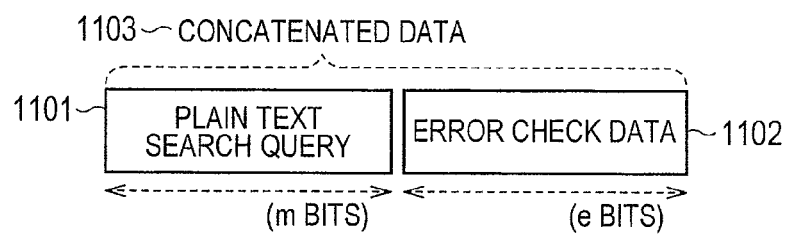
FIG. 11A is a block diagram exemplifying a data configuration of concatenated data created by the search client.

FIG. 11A is a block diagram exemplifying a data configuration of concatenated data 1103 which is created by the search client 200 based on the information input into the input form 1022 output on the output unit 202, in this embodiment.

Figure 11B:
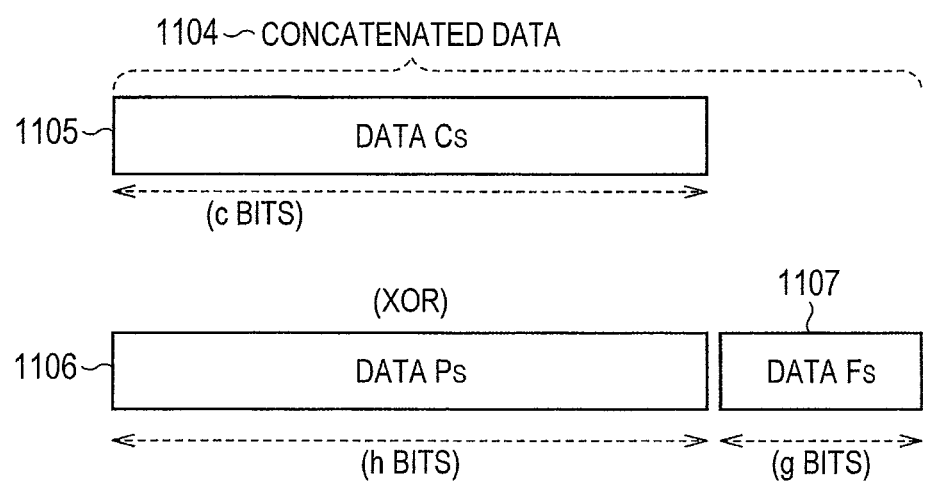
FIG. 11B is a block diagram exemplifying a data configuration of concatenated data created by the search client.

FIG. 11B is a block diagram showing a data configuration of concatenated data 1104 which is created by the search client 200 in a process of creating the secure encoded search query 1111, in this embodiment.

Figure 11C:
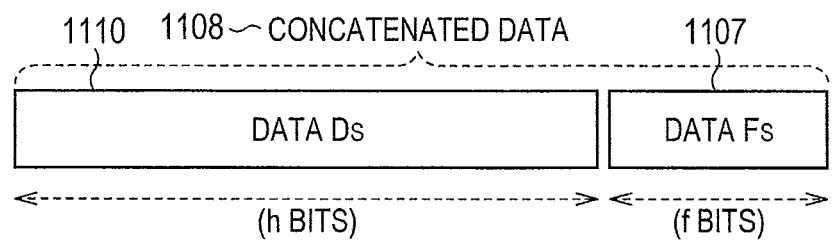
FIG. 11C is a block diagram exemplifying a data configuration of concatenated data created by the search client.

FIG. 11C is a block diagram showing a data configuration of concatenated data 1108 created by the search client 200, in this embodiment.

Descriptions will now be made to process procedures in which the search client 200 creates the secure encoded search query 1111 with different data values among respective creations, without depending on the data value input in the input forms 1022, with reference to FIGS. 11A, 11B, and 11C.

The entire processing unit 211 of the search client 200 performs a process for storing the information input in the input forms 1022 in the search query memory unit 230 of the memory unit 220, as the plaintext search query 1101. At this time, the plaintext search query 1101 is stored in the temporary information memory unit 280 of the search client 200, as data of m bits expressed as binary data.

The entire processing unit 211 of the search client 200 reads the check parameter 262 stored in the parameter memory unit 260, and performs a process for outputting it as error check data 1102. At this time, the output error check data 1102 is stored as e bit data, into the temporary information memory unit 280 of the search client 200.

The entire processing unit 211 of the search client 200 performs a process for concatenating the plaintext search query 1101 and the check data 1102 (S1101).

In the concatenating process, divided error check data 1102 may be inserted in some part of the plaintext search query 1101. For example, the error check data 1102 may be inserted in the head (header) and end (footer) of the plaintext search query 1101. The error check data 1102 may be mixed with the plaintext search query 1101, by being multiplexed thereby.

As illustrated in FIG. 11A, in the search client 200, the concatenated data 1103 is assumed as one single data, in which the error check data 1102 is concatenated with the end of the plaintext search query input by the entire processing unit 211. At this time, the concatenated data 1103 is stored as data of (m+e) bits, in the temporary information memory unit 280 of the registration client 200. The concatenating process is not limited to this process, and any other concatenating process is applicable.

As illustrated in FIG. 11B, descriptions will now be made to a data configuration of concatenated data 1104 created by the search client 200.

The entire processing unit 211 of the search client 200 performs a process for inputting the concatenated data 1103 as concatenated data of the plaintext search clear 1101 and the error check data 1102 and the secret key 251 stored in the secret key memory unit 250, into the encryption unit 212 (S1102).

The encryption unit 212 of the search client 200 encrypts input data, and performs a process for outputting data $C_S$ 1105 (S1103).

In the search client 200, the concatenated data 1103 input by the entire processing unit 211 is encrypted by the encryption unit 212, and the output data may be handled as data $C_S$ 1105. At this time, the data $C_S$ 1105 is stored as data of c bits, in the temporary information memory unit 280 of the search client 200 (S1104).

The data $C_S$ 1105 may depend on the concatenated data 1103, that is, the input information of the input forms 1022. For example, the same data $C_S$ 1105 may be output from the concatenated data 1103 having the same data value.

The entire processing unit of the search client 200 reads the secret key 251 from the secret key memory unit 250, and performs a process for inputting the secret key 251 into the pseudo-random number generator unit 214 (S1105).

The pseudo-random number generator unit 214 of the search client 200 performs a process for outputting a pseudo-random number using the input secret key 251. At this time, the pseudo-random number is stored as data $P_S$ 1106 of r bits, in the temporary information memory unit 280 of the search client 200 (S1106).

The pseudo-random number output by the pseudo-random number generator unit 214 does not depend on the concatenated data 1103 and the data $C_S$ 1105. Thus, the data $C_S$ 1106 can be created with different data values among respective data creations, without depending on the input information of the input forms 1022.

The data $P_S$ 11-6 outputs a random number based on the property of the pseudo-random number generation function. The data $P_S$ 1106 does not depend on the concatenated data 703 and the data $C_S$ 705. Thus, the data $P_S$ 1106 does not depend on the input information of the input form 1022, and data $F_S$ 1107 can be created with different data values among respective data creations.

The entire processing unit 211 of the search client 200 inputs the data $P_S$ 1106 and the function parameter 261 stored in the parameter memory unit 260, in the homomorphic function unit 216 (S1107).

The homomorphic function unit 216 of the search client 200 assumes the input data as an input value of the function having a homomorphic property, and performs a process for outputting a homomorphic function value expressed in a binary string, as the output value of the function calculation on the function parameter 261. At this time, the homomorphic function value is stored as the data $F_S$ 1107 of f bits, in the temporary information memory unit 280 of the search client 200 (S1108).

When the homomorphic function is "func", Equation (5) is satisfied (note that the function parameter 261 is not described), for the data $P_S$ as its input value and the data $F_S$ as the output value.

$$F_S = \text{func}(P_S) \quad (5)$$

The outputs of the data $F_S$ 1107 are uniformly distributed, when the input data values are uniformly distributed random numbers, based on the property of the homomorphic function to be processed by the homomorphic function unit 216. The data $F_S$ 1107 does not depend on the concatenated data 1103 and the data $C_S$ 1104. Thus, like the data $P_S$ 1106, the data $F_S$ 1107 can be created with different data values among respective data creations, without depending on the input information of the input forms 1022.

FIG. 11C is a block diagram showing a data configuration of concatenated data 1108 created by the search client 200, in this embodiment.

The entire processing unit 211 of the search client 200 concatenates the data $P_S$ 1106 with the data $F_S$ 1107, and performs a process for inputting the concatenated data 1104 and the data $C_S$ 1105 into the basic operation unit 217 (S1109).

The basic operation unit 217 of the search client 200 obtains an XOR calculation for each bit from the input concatenated data 1104 and the data $C_S$ 1105, and performs a process for outputting the obtained result as data $D_S$ 1110 (S1110).

The calculation of S1110 is performed using the data $P_S$ 1106 as a random number, without depending on the concatenated data 1103 and the data $C_S$ 1105. Thus, even when the relationship between the concatenated data 1103 and the data $C_S$ 1105 is uniquely set, the data $D_S$ 1110 can be obtained with different data values using the data $P_S$ 1106 with different data values among respective data creations.

The entire processing unit 211 of the search client 200 performs a process for inputting the concatenated data 1108 (concatenated data of the data $D_S$ 1110 with the data $F_S$ 1107) and the secret key 251 stored in the secret key memory unit 250, into the encryption unit 212 (S1111).

The encryption unit 212 of the search client 200 encrypts the input data. Then, the entire processing unit 211 performs a process for storing the encrypted data into the search query memory unit 230 as the secure encoded search query 1111 (S1112).

Because the concatenated data input to the encryption unit can be assumed as a random number, the output secure encoded search query 1111 can be assumed as a random number as well. Thus, even if the search client 200 transmits data to the DB server 300 through the network 400 which can be intercepted, the secure encoded search query 1111 is secured.

The secure encoded search query 1111 is obtained using the data $P_S$ 1106 and the data $F_S$ 1107 as random numbers, without depending on the concatenated data 1103 and the data $C_S$ 1105. The query 1111 can be obtained with different data values among respective data creations. As a result, the secure encoded search query 1111 which is the concatenated data of the data $D_S$ 1106 with the data $F_S$ 1107 is independent from the concatenated data 1103 and the data $C_R$ 1105. That is, the secure encoded search query 1111 can be created with different data values among respective data creations, without depending on the input information of the input forms 1022.

The above-described process procedures are not fixed, and so can be changed. For example, the process procedures S1109 and S1110 may be changed. Specifically, after an XOR calculation on the data $C_S$ 1105 and the data $P_S$ 1106 is made in S1109, the data $F_S$ 1107 and the data $D_S$ 1110 may be concatenated together in S1110. Similarly, any other process procedures may be changed.

The control unit 210 in charge of each of the above-described processes is not fixed, and so can be changed. For example, in S1105, the secret key 251 may be input to the compression function unit 215, instead of the pseudo-random number generator unit 214.

The data configuration of the secure encoded search query 111 may be changed, and the processes may be changed as well in accordance with the change. For example, the entire processing unit 211 performs a process for inputting the data $F_S$ 1107 and the secret key 251 stored in the secret key memory unit 250, to the encryption unit 212 (S1111). The concatenated data of the data output by the encryption unit and the data $D_S$ 1106 may be assumed as the secure encoded search query 1111 (S1112).

Figure 12:
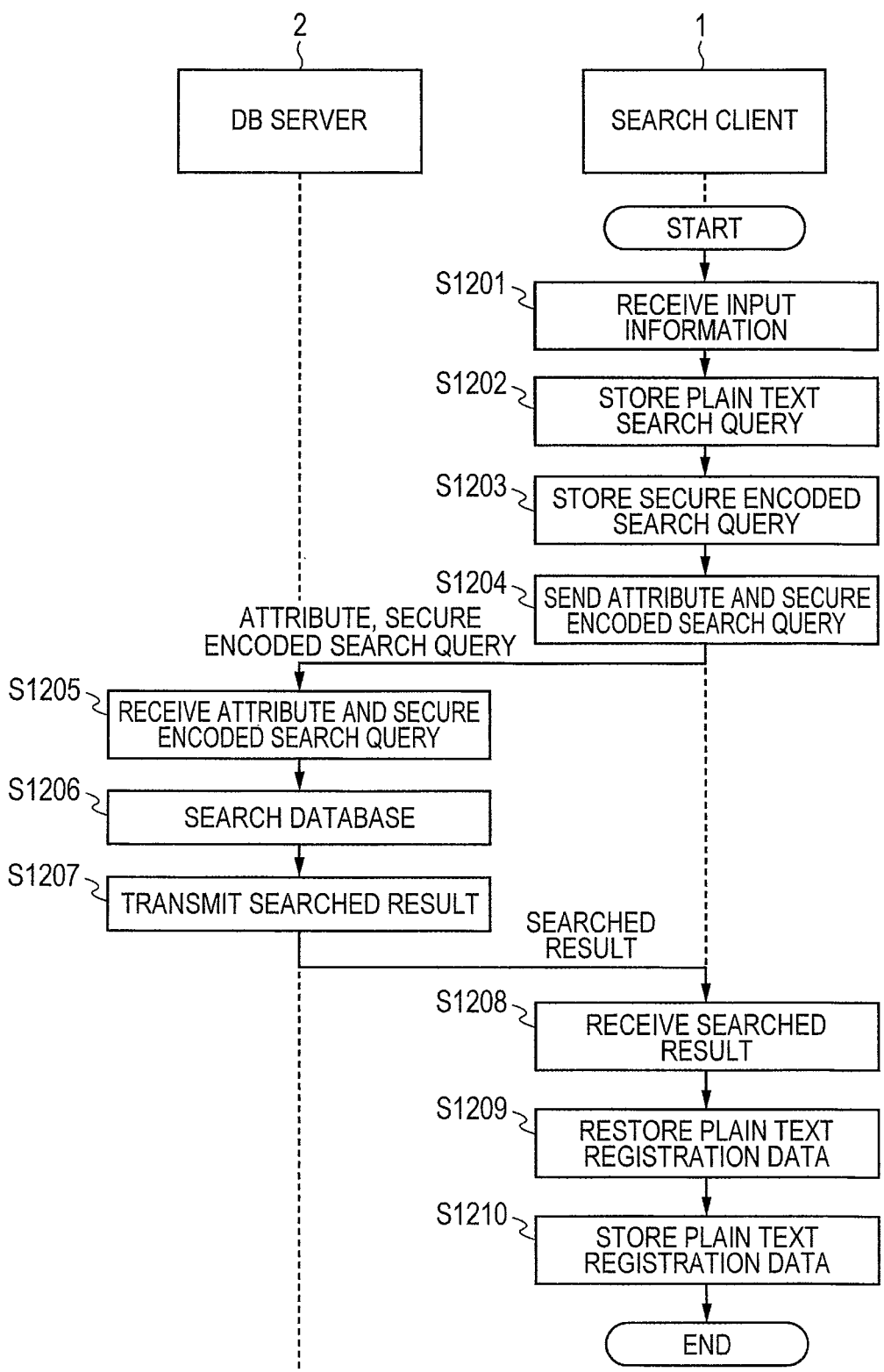
FIG. 12 is a sequence diagram exemplifying a process in which the search client searches the DB server for a database, using a secure encoded search query.

FIG. 12 is a sequence diagram showing a process in which the DB server 300 searches the database 341 using the secure encoded search query 232 transmitted by the search client 200 through the network 400, in this embodiment.

The search client 200 performs a process for storing information input from the user to the form, into the temporary information memory unit 280 through the input unit 201 (S1201).

The search client 200 detects user selection on the "SEARCH" button 1050 through the input unit 201, and then performs a process for storing the information input to the form into the memory unit 220 as the plaintext search query 231 (S1202).

The search client 200 creates the secure encoded search query 232 under the control of the control unit 210, and performs a process for storing it in the memory unit 220 (S1203).

The search client 200 performs a process for transmitting the attributes 233 and the secure encoded search query 232 to the DB server 300 from the communication unit 203 through the network 400 (S1204).

The DB server 300 performs a process for receiving the attributes 233 and the secure encoded search query 232 transmitted by the search client 200 from the communication unit 303 through the network 400 (S1205).

The DB server 300 performs a process for searching secure encoded registration data 902 corresponding to the secure encoded search query 332 from the database 341 based on the attributes 233, under the control of the control unit 310 (S1206).

The DB server 300 performs a process for transmitting a searched result corresponding to the secure encoded search query 332 (attributes 901 and a part of secure encoded registration data 902), to the search server from the communication unit 303 through the network 400 (S1207).

The search client 200 performs a process for receiving a searched result corresponding to the secure encoded search query 232 transmitted by the DB server, from the communication unit 203 through the network 400 (S1208).

The search client 200 restores the plaintext registration data 272 from the searched result corresponding to the secure encoded search query 232 under the control of the control unit 210 (S1209).

The search client 200 stores the extracted plaintext registration data 272 into the memory unit 220 through the output unit 202. It may perform a process for displaying the extracted plaintext registration data 272 on the output unit 202 (S1210).

In this embodiment, the control unit 310 of the DB server 300 searches the secure encoded registration data 902 in accordance with process procedures from S1301 to S1318, as shown in S1206.

The entire processing unit of the DB server 300 sets the secure encoded registration data 902, as target data to be searched, corresponding to the attribute 901 of the database 341 in association with the received attributes 233.

FIG. 9B is a block diagram exemplifying target data to be searched in the database 341 stored in the database memory unit 340 of the memory unit 320 in the DB serve 300, using the block diagram of FIG. 9A.

For example, when the received attribute 233 is information regarding the "NAME", the entire processing unit 311 of the DB server 300 handles the attribute 901 regarding the "NAME" of the database 341 as the target secure encoded registration data 902 to be searched, as shown in the part enclosed with a thick solid line in FIG. 9B.

The process procedures from S1301 to S1318 for searching for the secure encoded registration data 902 are executed entirely for the target secure encoded registration data 902 to be searched, some secure encoded registration data 902 which has arbitrarily been extracted from the target secure encoded registration data 902 to be searched, or a certain amount of secure encoded registration data 902.

Figure 13A:
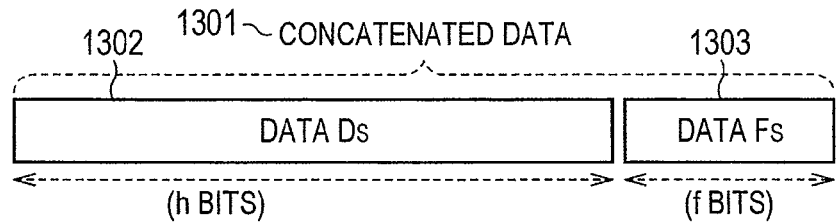
FIG. 13A is a block diagram exemplifying a data configuration of concatenated data which has been obtained by decrypting the secure encoded search query received by the DB server from a communication unit.

FIG. 13A is a block diagram showing a data configuration of concatenated data 1301 which has been obtained by the DB server 300 decrypting the secure encoded search query received from the communication unit 303.

Figure 13B:
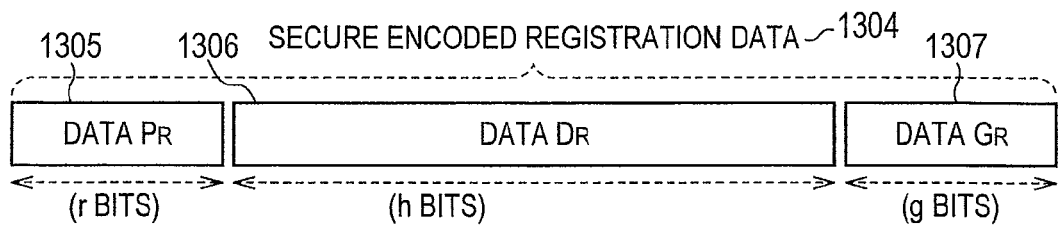
FIG. 13B is a block diagram exemplifying a data configuration of secure encoded registration data stored in the database memory unit by the DB server.

FIG. 13B is a block diagram exemplifying a data configuration of secure encoded registration data 1304 in the database 341 which is stored in the database memory unit 340 by the DB server 300, in this embodiment.

Figure 13C:
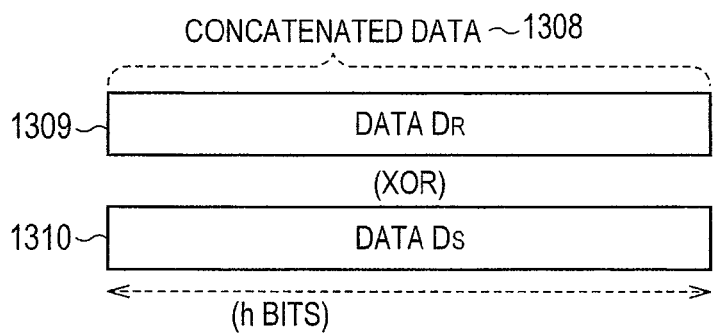
FIG. 13C is a block diagram exemplifying a data configuration of concatenated data created by the DB server.

FIG. 13C is a block diagram exemplifying a data configuration of concatenated data 1308 which is created by the DB server 300 in a process of searching for the secure encoded registration data 1304 using the concatenated data 1301, in this embodiment.

Figure 13D:
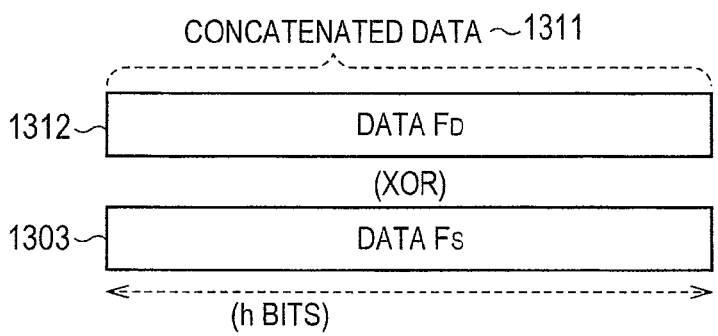
FIG. 13D is a block diagram exemplifying a data configuration of concatenated data created by the DB server.

FIG. 13D is a block diagram exemplifying a data configuration of concatenated data 1311 which is created by the DB server 300 in a process of searching for the secure encoded registration data 1304 using the concatenated data 1301, in this embodiment.

Descriptions will now be made to process procedures in which the DB server 300 appropriately searches for the secure encoded registration data 1304 using the concatenated data 1301 with different data values among respective data creations, using FIGS. 13A, 13B, 13C, and 13C.

The entire processing unit 311 of the DB server 300 performs a process for receiving a secure encoded search query 1300 using the communication unit 303. At this time, the entire processing unit 311 of the DB server 300 stores the secure encoded search query 1300 in the search query memory unit 330.

The entire processing unit 311 of the DB server 300 performs a process for inputting the secure encoded search query 1300 and the secret key 351 stored in the secret key memory unit 350 into the decryption unit 313 (S1301).

The decryption unit of the DB server 300 decrypts the input secure encoded search query 1300, and performs a process for outputting the concatenated data 1301 (S1302). At this time, the concatenated data 1301 is stored in the temporary information memory unit 280 of the DB server 300 as data of (h+f) bits as binary data, as illustrated in FIG. 13A.

The entire processing unit 311 of the DB server 300 performs a process for retrieving data $D_S$ 1302 from the concatenated data 1301 (S1303).

In S1303, for example, as illustrated in FIG. 13A, the entire processing unit 311 of the DB server 300 may extract the head h bits corresponding to the data $D_S$ 1302 from the concatenated data 1301.

The entire processing unit 311 of the DB server 300 reads the secure encoded registration data 1304 in the database 341 stored in the database memory unit 340, and performs a process for retrieving data $D_R$ 1306 from the secure encoded registration data 1304 (S1304).

In S1304, for example, as illustrated in FIG. 13B, the DB server 300 may handle remaining data as the data $D_R$ 1306. This remaining data is obtained by the entire processing unit 311 by removing the head r bits corresponding to the data $P_R$ 1305 and the end g bits corresponding to data $G_R$ 1307, from the secure encoded registration data 1304.

FIG. 13C is a block diagram showing a data configuration of the concatenated data 1308 created by the DB server 300, in this embodiment.

A check is made, using the homomorphic function unit 316, as to whether there is any correlation between the data $H_R$ 707 and the data $P_S$ 1106. The data $H_R$ 707 is used by the registration client 100 for probabilistic encryption of the data $C_R$ 705, while the data $P_S$ 1106 is used by the search client 200 for probabilistic encryption of the data $C_S$ 1105.

The entire processing unit 311 of the DB server 300 performs a process for inputting the data $D_R$ 711 and the data $D_S$ 1302 into the basic operation unit 317 (S1305).

The basic operation unit 117 of the registration client 100 performs an XOR calculation for each bit of both of input data $D_R$ 1309 and data $D_S$ 1310, and performs a process for outputting the calculated result as the concatenated data 1308 (S1306).

In S1305 and S1306, a relational expression is derived between the data $H_R$ 707 and the data $P_S$ 1106. The data $H_R$ 707 is for hiding information input to the input form 622 of the registration client 100, while the data $P_S$ 1106 is for the search client 200 to hide information input in the input form 1022.

In fact, following equation (6) can be derived when input information of the registration client 100 and the search client 200 are equal to each other as a result of the XOR calculation in S1306, that is, when the data values of the data $C_S$ 705 and the data $C_R$ 1105 are equal to each other.

$$D_S \text{xor} D_R = P_S \text{xor} H_R \text{ (when } C_S = C_R\text{)} \qquad (6)$$

FIG. 13D is a block diagram showing a data configuration of the concatenated data 1311 created by the DB server 300, in this embodiment.

The entire processing unit 311 of the DB server 300 inputs the concatenated data 1308 and the function parameter 361 stored in the parameter memory unit 360 into the homomorphic function unit 316 (S1307).

The homomorphic function unit 316 of the DB server 300 assumes the input data as an input value of a function having a homomorphic property, and performs a process for outputting the homomorphic function value expressing an output value of the functional calculation in a binary string using the function parameter 361. At this time, the homomorphic function value is stored in the temporary information memory unit 380 of the DB server 300 as data $F_D$ 1312 of h bits (S1308).

$$F_D = F(P_S \text{xor} H_R) = F_S \text{xor} F_R \qquad (7)$$

Equation (7) can be derived from Equation (3), Equation (5), and Equation (6).

The entire processing unit 311 of the DB server 300 performs a process for retrieving data $F_S$ 1303 from the concatenated data 1301 (S1309).

In S1309, for example, as illustrated in FIG. 13A, the DB server 300 may extract the end f bits corresponding to the data $F_S$ 1303 from the concatenated data 1301 input by the entire processing 311.

The entire processing unit 311 of the DB server 300 performs a process for inputting the data $F_D$ 1312 and the data $F_S$ 1303 into the basic operation unit 317 (S1310).

The basic operation unit 317 of the DB server 300 performs an XOR calculation for each bit of the input data $F_D$ 1312 and the data $F_S$ 1303, and performs a process for outputting the calculated result as data $D_D$ 1313 (S1311).

When the data value of the data $C_S$ 705 is equal to the data value of the data $C_R$ 1105, that is, when Equation (7) is satisfied, the procedure of S1311 is based on Equation (8).

$$D_R = F_D \text{xor} F_S = F_R \qquad (8)$$

Thus, when the data values of the data $C_S$ 705 and the data $C_R$ 1105 are equal to each other, the data value of the data $D_R$ 1313 is equal to the data $F_R$ 708.

The entire processing unit 311 of the DB server 300 performs a process for inputting the data $D_R$ 1313 into the compression function unit 315 (S1312).

The compression function unit 315 of the DB server 300 converts the input data, and performs a process for outputting a hash value. At this time, the hash value is stored in the temporary information memory unit 180 of the registration client 100 as data $G_D$ 1314 of g bits (S1313).

The entire processing unit 311 of the DB server 300 performs a process for inputting the data $G_B$ 1314 and the data $G_R$ 1307 into the basic operation unit 317 (S1314).

The basic operation unit 317 of the DB server 300 performs an XOR calculation for each bit of the input data $G_D$ 1314 and the data $G_R$ 1307, and outputs the calculated result as data $E_D$ 1315 (S1315).

When Equation (5) is satisfied, the data value of the data $G_D$ 1314 is equal to the data $G_R$ 1307, and the data value of data $E_D$ 1315 is "0" from Equation (9).

$$G_D \text{xor} G_S = 0 \qquad (9)$$

The entire processing unit 311 of the DB server 300 determines whether the bit value of the data $E_D$ 1315 is "0" for an arbitrary number of times (S1316).

When the data value of the data $E_D$ 1315 examined in S1316 is not "0", the entire processing unit 311 of the DB server 300 can determine that there is no relationship between the secure encoded search query 1300 and the secure encoded registration data 1304. At this time, the control unit 310 of the DB server 300 continues a process for searching for the secure encoded registration data 1304, back to S1304, entirely for the target secure encoded registration data 1304 to be searched, entirely for the secure encoded registration data 1304 arbitrarily extracted from the target secure encoded registration data 1304 to be searched, or until reaching a constant amount of secure encoded registration data 1304 to be searched (S1317).

When the data value of the data $E_D$ 1315 examined in S1316 is "0", the entire processing unit 311 of the DB server 300 determines that there is a relationship between the secure encoded search query 1300 and the secure encoded registration data 1304. At this time, the determined secure encoded registration data 1304 and the secure encoded registration data 1304 corresponding to the related attribute 901 are assumed as searched results corresponding to the secure encoded search query 1300 (S1318).

For example, as illustrated in FIG. 9B, when the searched attribute 901 is information regarding the "NAME", and when the entire processing unit 311 of the DB server 300 determines that the secure encoded registration data 1304 having a relationship with the secure encoded search query 1300 is "$d_{k+1}$", the data item "$d_{k+1}$" as the determined secure encoded registration data 1304 and the secure encoded registration data 1304 may be assumed as those searched results corresponding to the secure encoded search query 1300. Note that the secure encoded registration data 1304 ($d_k$, $d_{k+2}$, $d_{k+3}$, . . . ) is enclosed with the thick solid line of FIG. 9B corresponding to the attribute 901.

As described above, when the registration client 100 creates the secure encoded registration data 712 with different data values among respective data creations, and when the search client 200 creates the secure encoded search query 1111 having different data values among respective data creations, the secure encoded registration data 1304 corresponding to the received secure encoded search query 1300 can appropriately be searched.

As shown in Equation (6), in the searching process, the data values of the data $C_S$ 705 and the data $C_R$ 1105 are offset from each other. Thus, the data values of the data $C_S$ 705 and the data $C_R$ 1105 are not leaked out to the DB server 300.

The above-described process procedures are not fixed, and so can be changed. For example, the process procedures S1303 and S1305, and the process procedures S1304 and S1306 may be changed. That is, in S1304, the data $D_R$ 1306 may be retrieved, and in S1306, the data $D_S$ 1302 may be retrieved. Similarly, any other process procedures may be changed.

The control unit 310 in charge of the above-described process is not fixed, and so can be changed. For example, when the DB server 300 includes the encryption unit 312, the data $D_R$ 1313 may be input into the encryption unit 312, instead of the compression function unit 315. In S1314, data output from the encryption unit 312 may be stored in the temporary information memory unit 380, as the data $G_D$ 1314.

The determination criterion in the searching process may be changed. For example, in S1316, the determination may be made using a determination equation regarding the magnitude relation between a particular changeable value and the data value of the data $E_D$ 1315, instead of determining as to whether an arbitrary bit of the data $E_D$ 1315 is equal to "0".

The searched result may be formed using a changed data configuration of the secure encoded registration data 1304 corresponding to the secure encoded search query 1301. For example, information regarding the data $G_R$ 1307 may not include the searched result.

If the DB server 300 includes a pseudo-random number generator unit 314, instead of using the data $G_R$ 1307, concatenated data of a pseudo-random number output by the pseudo-random number generator unit 314 may be included in the searched result, as the secure encoded registration data 1304 corresponding to the secure encoded search query 1301. In this case, the entire processing unit 311 inputs a secret key 351 into the pseudo-random number generator unit 314. The data $G_R$ 1307 and the pseudo-random number may both be included in the searched result as the secure encoded registration data corresponding to the secure encoded search query 1301. The general index may be used instead of using the pseudo-random number.

If the DB server 300 includes the encryption unit 313, the entire processing unit 311 inputs the secure encoded registration data 1304 corresponding to the secure encoded search query 1301 and the secret key 351 into the encryption unit 313. The output data may be assumed as a searched result. When the secure encoded registration data corresponding to the secure encoded search query 1300 is concatenated with a pseudo-random number or the general index, the value input into the encryption unit 313 differs at any time. Thus, data output by the encryption unit 313 can be assumed as a random number. Thus, even if the DB server 300 transmits data to the search client 200 through the network 400 which can be intercepted, the searched result is secured.

In this embodiment, the control unit 210 of the search client 200 decrypts the entire received secure encoded registration data 1304 or a part of the secure encoded registration data 1304, as shown in S1209. The process procedure for extracting the plaintext registration data 272 is performed in accordance with the process procedures from S1401 to S1411.

Figure 14A:
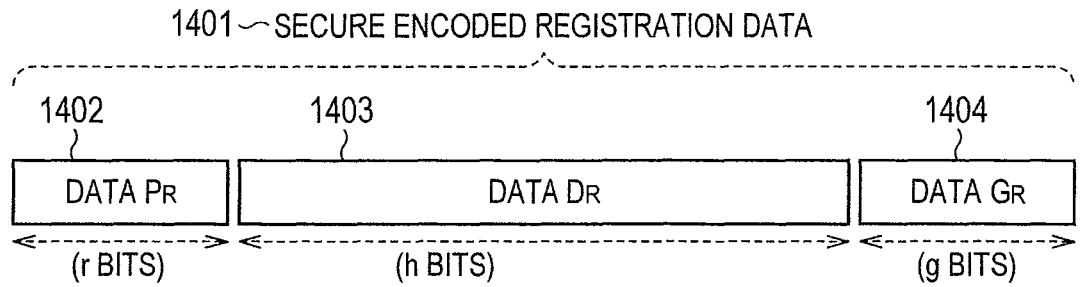
FIG. 14A is a block diagram exemplifying a data configuration of secure encoded registration data received by the search client from the communication unit.

FIG. 14A is a block diagram exemplifying a data configuration of the secure encoded registration data 1401 which is received by the search client 200 from the communication unit 203, in this embodiment.

Figure 14B:
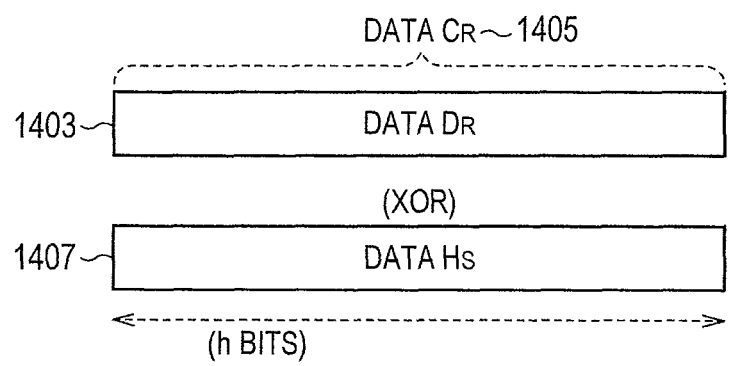
FIG. 14B is a block diagram exemplifying a data configuration of data $C_R$ created by the search client.

FIG. 14B is a block diagram exemplifying a data configuration of data $C_R$ 1405 which is created by the DB server 300 in a process of decrypting the secure encoded registration data 1401, in this embodiment.

Figure 14C:
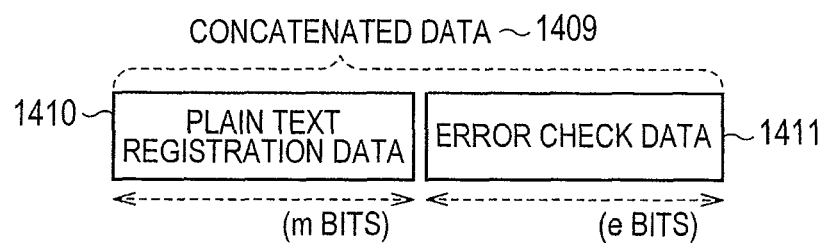
FIG. 14C is a block diagram exemplifying a data configuration of concatenated data created by the DB server.

FIG. 14C is a block diagram exemplifying a data configuration of concatenated data 1409 which is created by the DB server 300 in a process of decrypting the secure encoded registration data 1401, in this embodiment.

Descriptions will now be made to process procedures in which the search client 200 decrypts plaintext registration data 1410 from the secure encoded registration data 1401, with reference to FIGS. 14A, 14B, 14C, and 14D.

The entire processing unit 211 of the search client 200 performs a process for receiving the secure encoded registration data 1401 using the communication unit 203. At this time, the search client 200 stores the registration data 1401 in the search query memory unit 230, as data expressed as binary data of (r+h+g) bits.

The entire processing unit 211 of the search client 200 performs a process for retrieving data $P_R$ 1402 from the secure encoded registration data 1401 (S1401).

In S1401, for example, as illustrated in FIG. 14, the search client 200 may extract the head r bits corresponding to the data $P_R$ 1402, from the secure encoded registration data 1401 input by the entire processing unit 211.

Then entire processing unit 211 of the search client 200 reads the secret key 251 from the secret key memory unit 250, and performs a process for inputting the secret key 251 and the data $P_R$ 1402 into the compression function unit 215 (S1402).

The compression function unit 215 of the search client 200 converts the input data, and performs a process for outputting a hash value (S1403). At this time, the hash value is stored as data $H_S$ 1407 of h bits in the temporary information memory unit 280 of the search client 200.

FIG. 14B is a block diagram showing a data configuration of data $C_R$ 1405 created by the DB server 300, in this embodiment.

The entire processing unit 211 of the search client 200 performs a process for inputting data $D_R$ 1403 and the data $H_S$ 1407 into the basic operation unit 217 (S1404).

The basic operation unit of the search client 200 performs an XOR calculation for each bit of the input data $D_R$ 1403 and the data $H_S$ 1407, and performs a process for outputting the calculated result as the data $C_R$ 1405 (S1405).

In the XOR calculation in S1407, the data $H_R$ 1407, the data $D_R$ 1403, and the data $C_R$ 1405 satisfy Equation (10).

$$C_R = H_R \text{xor} D_R \tag{10}$$

Note that Equation (10) is an equation with a modified form of Equation (4).

The entire processing unit 211 of the search client 200 performs a process for inputting the data output by the basic operation unit 217 and the secret key 251 stored in the secret key memory unit 250 into the decryption unit 213 (S1406).

The decryption unit of the search client 200 decrypts the input data $C_R$ 1405, and performs a process for outputting the concatenated data 1409 (S1407). At this time, as illustrated in FIG. 14C, the concatenated data 1409 is stored in the temporary information memory unit 280 of the search client 200 as data of (m+e) bits.

The entire processing unit 211 of the search client 200 performs a process for retrieving error check data 1411 from the concatenated data 1409 (S1408).

For example, as illustrated in FIG. 14C, the search client 200 may assume and extract the end e bits from the concatenated data 1403 input by the entire processing unit 211, as the error check data 1411.

The entire processing unit 211 of the search client 200 reads the check parameter 262 stored in the parameter memory unit 260, and performs a process for inputting the data converted as data for check and the error check data 1411, into the basic operation unit 217 (S1409).

The basic operation unit 217 of the search client 200 compares the input converted data for check and the error check data 1411, and performs a process for outputting the comparison result (S1410).

For example, if the data for check and the error check data, expressed in a binary string, are equal to each other, the unit outputs a bit (1) expressing an equal sign. If both data are not equal to each other, the unit outputs a bit (0) expressing a sign of inequality.

For example, if the basic operation unit 217 outputs a bit (1) expressing an equal sign, the entire processing sign 211 of the search client 200 performs a process for determining that it is a correct search result. If the basic operation unit 217 outputs a bit (0) expressing a sign of inequality, the entire processing unit 311 of the DB server 300 performs a process for determining that it is an incorrect search result.

The entire processing unit 211 of the search client 200 performs a process for setting the plaintext registration data 1410 extracted from the concatenated data 1402 in accordance with the result output by the basic operation unit 217, and ends (S1411) a process (S1209) for restoring the plaintext registration data 1410. For example, as illustrated in FIG. 14C, the search client 200 assumes the head m bit data of the concatenated data 1409 input by the entire processing unit 211 as the plaintext registration data 1410.

When to take every possible measure to prevent the unauthorized action toward the DB server 300, the searched result corresponding to the search is deleted from the DB server 300. After the order of the decrypted plaintext registration data 1410 is randomly shuffled, the secure encoded registration data may be registered again into the DB server from the search client 200 or the registration client 100.

DESCRIPTION OF THE REFERENCE NUMERALS

100: Registration Client, 200: Search Client, 300: DB Server, 400: Network, 500: Computer, 101, 201, 301: Input Unit, 102, 202, 302; Output Unit, 103, 203, 303: Communication Unit, 110, 210, 310: Control Unit, 111, 211, 311: Entire Processing Unit, 112, 212: Encryption unit, 213, 313: Decryption unit, 114, 214: Pseudo-random number generator unit, 115, 215, 315: Compression Function Unit, 116, 216, 316: Homomorphic Function Unit, 117, 217, 317: Basic Operation Unit, 120, 220, 320: Memory Unit, 130: Registration Data Memory Unit, 131, 272, 701, 1410: Plaintext Registration Data, 132, 271, 712, 1304, 1401: Secure encoded Registration Data, 133, 233: Attribute, 230, 330: Search Query Memory Unit, 231, 1101: Plaintext Search Query, 232, 332, 1111, 1300: Secure encoded Registration Query, 340: Database Memory Unit, 341: Database, 150, 250, 350: Secret Key Memory Unit, 151, 251, 351: Secret Key, 160, 260, 360: Parameter Memory Unit, 161, 261, 361: Function Parameter, 162, 262: Check Parameter, 270: Received Data Memory Unit, 180, 280, 380: Temporary Information Memory Unit, 501: CPU (Central Processing Unit), 502: Memory, 503: External Memory Device, 508: Recording Medium, 507: Read/Write Device, 506: Input Device, 505: Output Device, 504: Communication Device, 509: Internal Communication Line, 600: Displaying Contents of Output Unit 101, 610: Selection Unit of Management Method, 620: Management Form Unit, 601, 1011: Attribute, 622, 1022: Input Form, 650: Execute Button, 660, 1060: Clear Button, 1000: Displaying Contents of Output Unit 102, 1010: Search Item Unit, 1020: Search Form Unit, 1050: Search Button, 702, 1411: Error Check Data, 703, 704, 1103, 1104, 1108, 1301, 1308, 1311, 1409: Concatenated Data, 705: Data $C_R$, 706: Data $P_R$, 707: Data $H_R$, 708: Data $F_R$, 709: Data $G_R$, 711: Data $D_R$, 1102: Error Check Data, 1105: Data $C_S$, 1106: Data $P_S$, 1107: Data $F_S$, 1110: Data $D_S$, 1302: Data $D_S$, 1303: Data $F_S$, 1305: Data $P_R$, 1306: Data $D_R$, 1307: Data $G_R$, 1309: Data $D_R$, 1310: Data $D_S$, 1312: Data $F_D$, 1313: Data $D_D$, 1314: Data $G_D$, 1315: Data $E_D$, 1402: Data $P_R$, 1403: Data $D_R$, 1404: Data $G_R$, 1405: Data $C_R$, 1407: Data $H_S$.

What is claimed is:

1. A server coupled to a network used for communication with a client, the server comprising:
   a memory storing data; and
   a controller, coupled to the memory and the network,
   wherein the memory stores an encrypted data which includes a first data which is an encrypted original data that is encrypted by a first secret key and a first random number, and a first hashed value calculated by a first homomorphic function value of the first random number,
   wherein the network receives from the client an encrypted query which includes a second data, which is a keyword encrypted by a second secret key and a second random number, and a second homomorphic function value of the second random number, and
   wherein the controller is configured to:
   calculate a third homomorphic function value based on the first random number and the second random number, and process the third homomorphic function value using the second homomorphic function value to generate a fourth homomorphic function value,
   convert the fourth homomorphic function value to the first data,
   generate a second hashed value from the first data, and
   determine whether the first hashed value is equal to the second hashed value,
   wherein each time the second secret key is used once for encrypting, a value of the second secret key is updated to a new second secret key.

2. The server according to claim 1, wherein each time the first secret key is used once for encrypting, a value of the first secret key is updated to a new value.

3. The server according to claim 1, wherein second random number is determined based on the most recent value of the second secret key.

4. The server according to claim 2, wherein first random number is determined based on the most recent value of the first secret key.

* * * * *